US011823266B2

(12) United States Patent
Economides et al.

(10) Patent No.: US 11,823,266 B2
(45) Date of Patent: Nov. 21, 2023

(54) SYSTEMS AND METHODS FOR TRANSACTING OF UNITS DERIVED FROM NON-COMMODIFIABLE WORK PRODUCTS

(71) Applicants: Alexander Economides, Houston, TX (US); Dorothy Haraminac, Baytown, TX (US); Tri Nguyen, Houston, TX (US)

(72) Inventors: Alexander Economides, Houston, TX (US); Dorothy Haraminac, Baytown, TX (US); Tri Nguyen, Houston, TX (US)

( * ) Notice: Subject to any disclaimer, the term of this patent is extended or adjusted under 35 U.S.C. 154(b) by 198 days.

(21) Appl. No.: 17/510,342

(22) Filed: Oct. 25, 2021

(65) Prior Publication Data

US 2022/0129982 A1 Apr. 28, 2022

Related U.S. Application Data

(60) Provisional application No. 63/105,220, filed on Oct. 24, 2020.

(51) Int. Cl.
*G06Q 40/04* (2012.01)
*G06Q 20/38* (2012.01)

(52) U.S. Cl.
CPC ........... *G06Q 40/04* (2013.01); *G06Q 20/389* (2013.01)

(58) Field of Classification Search
CPC .. G06Q 40/04; G06Q 20/389; G06Q 2220/00; G06Q 20/02; G06Q 20/0655; G06Q 20/381
See application file for complete search history.

(56) References Cited

U.S. PATENT DOCUMENTS

| 7,343,341 | B2* | 3/2008 | Sandor | G06Q 30/08 |
| | | | | 705/37 |
| 2002/0069180 | A1 | 6/2002 | Bible et al. | |
| 2012/0310859 | A1 | 12/2012 | Variankaval et al. | |
| 2018/0322585 | A1 | 11/2018 | Deguchi | |
| 2018/0375847 | A1 | 12/2018 | Schropfer | |
| 2020/0027096 | A1* | 1/2020 | Cooner | G06Q 40/04 |

FOREIGN PATENT DOCUMENTS

| DE | WO 2003/016434 | * | 2/2003 | ............... B07B 1/10 |
| GB | 2447513 | * | 9/2008 | ............. B01D 53/62 |
| WO | WO-2012145303 A2 | * | 10/2012 | ............. B01D 53/02 |

OTHER PUBLICATIONS

Haszeldine et al.: Storing Carbon for Geologically Long Timescales to Engineer Climate, 2014, Issues in Environmental Science and Technology, 38, pp. 22-51. (Year: 2014).*
Nguyen, Terry: More Companies Want to be "Carbon Neutral." What does that Mean? Jun. 16, 2020, Vox, pp. 1-7. (Year: 2020).*

(Continued)

*Primary Examiner* — Bijendra K Shrestha
(74) *Attorney, Agent, or Firm* — Alberto Q. Amatong, Jr.; Amatong McCoy LLC

(57) ABSTRACT

Provided herein are systems, methods, and articles for generating and handling units or records derived from non-commodifiable work products, and the like. The disclosure provides for generating a certification record, including receiving work product data and generating a digitized record derived from the work product data.

12 Claims, 28 Drawing Sheets

(56) References Cited

OTHER PUBLICATIONS

Parajuli et al.: An Introduction to Forest Carbon Offset Market: Eastern Forestry Notes, Jul. 10, 2019, NC State Extension, pp. 1-10. (Year: 2019).*

International Search Report and Written Opinion dated Feb. 23, 2022 (issued in PCT Application No. PCT/US2021/056519) [15 pages].

Lynch. "Love labour as a distinct and non-commodifiable form of care labour." The Sociological Review, 55:3 (2007). Accessed on Jan. 2022, pp. 550-570 (21 Pages total).

Manski et al. "Reimagining new socio-technical economics through the application of distributed ledger technologies.", Frontiers in Blockchain, vol. 2. Accessed on Jan. 31, 2022, pp. 1-17 (17 pages total).

\* cited by examiner

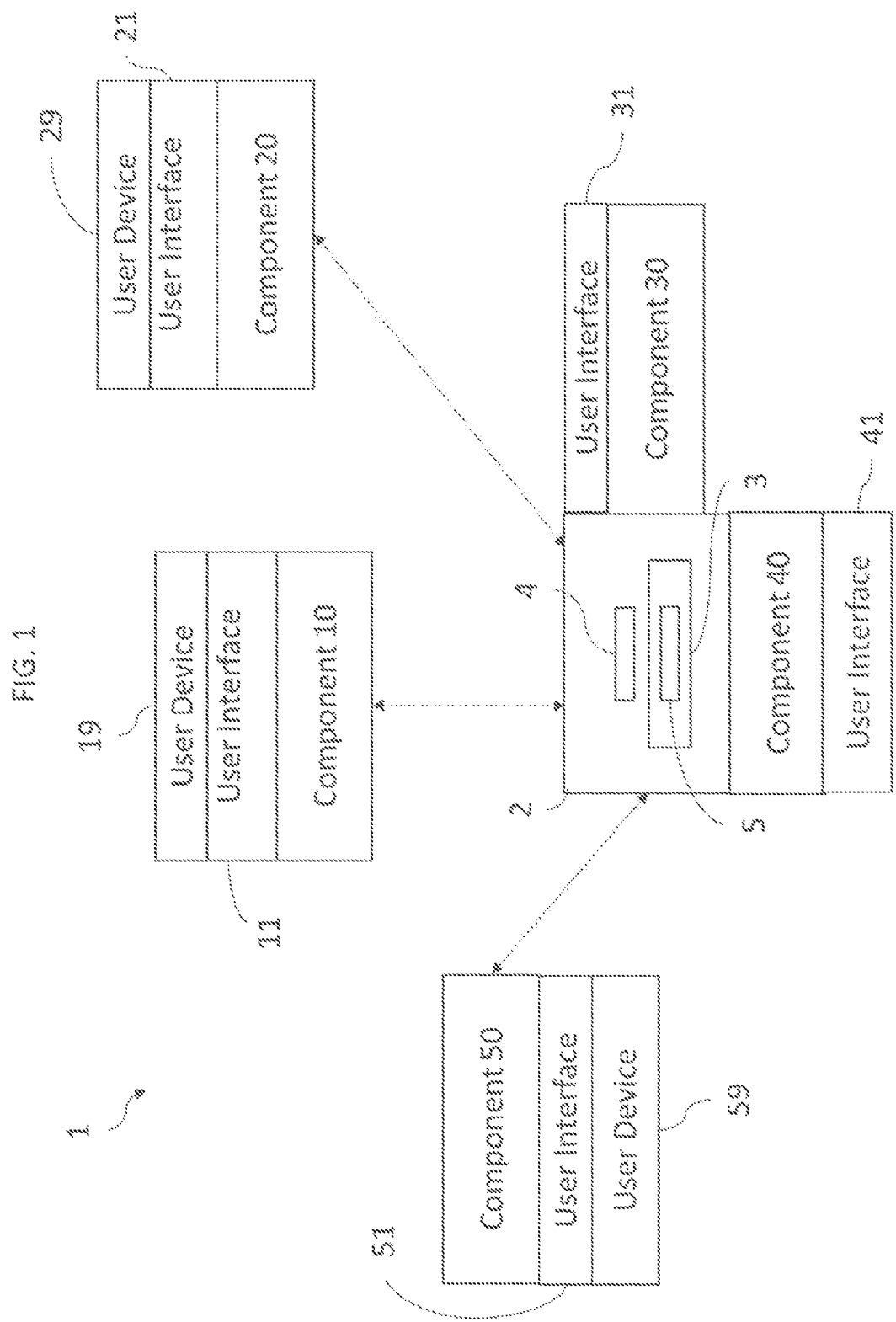

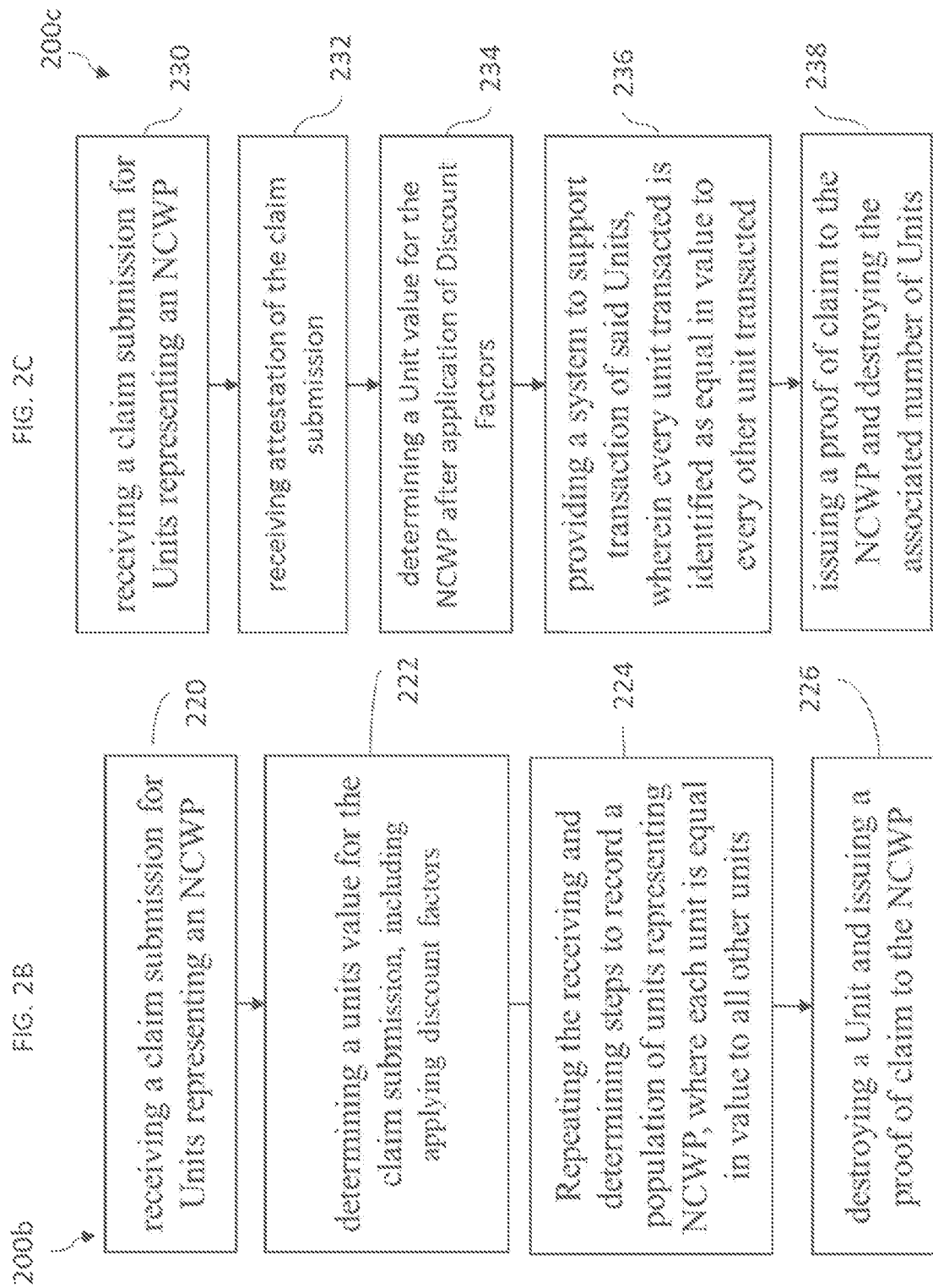

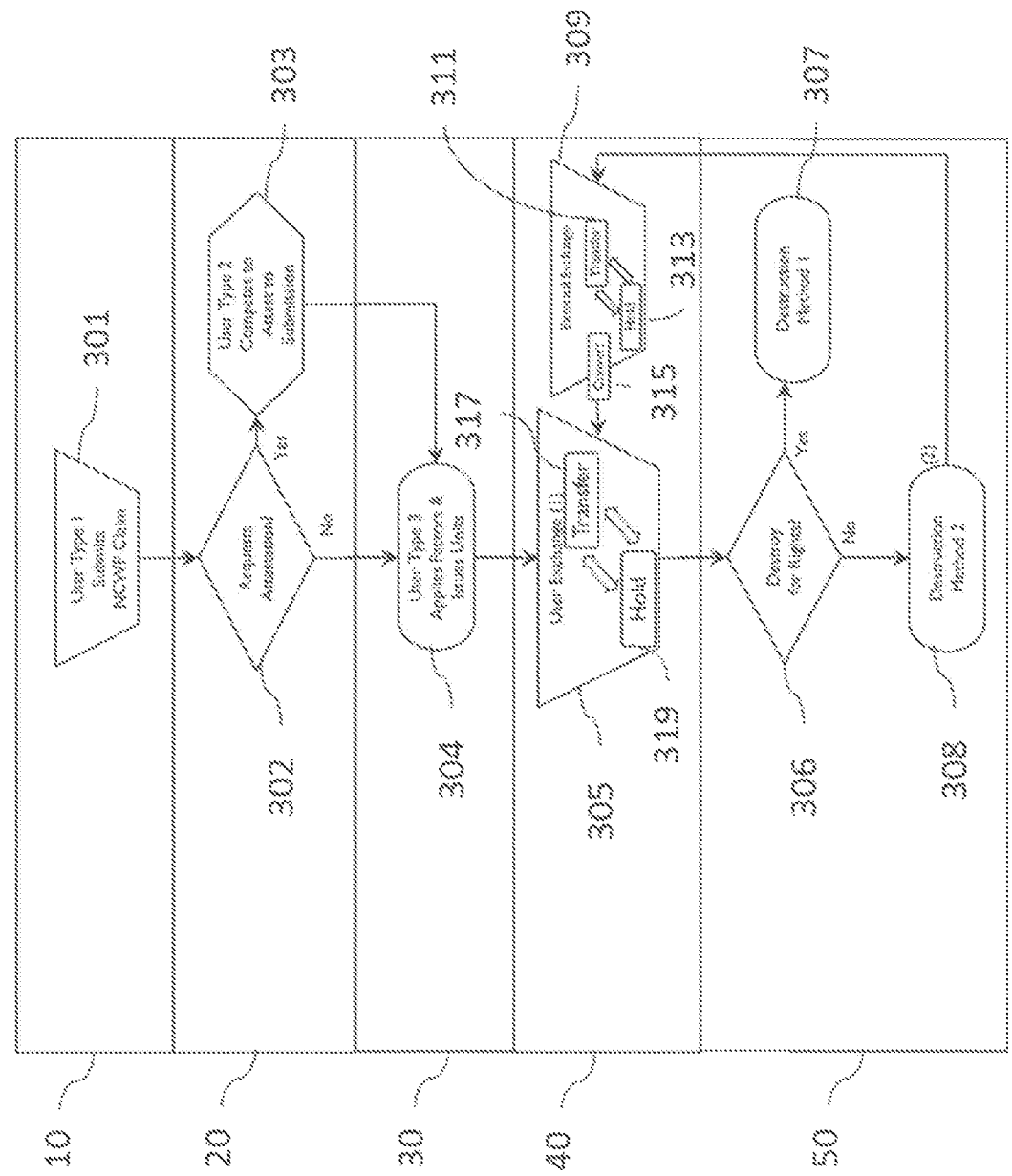

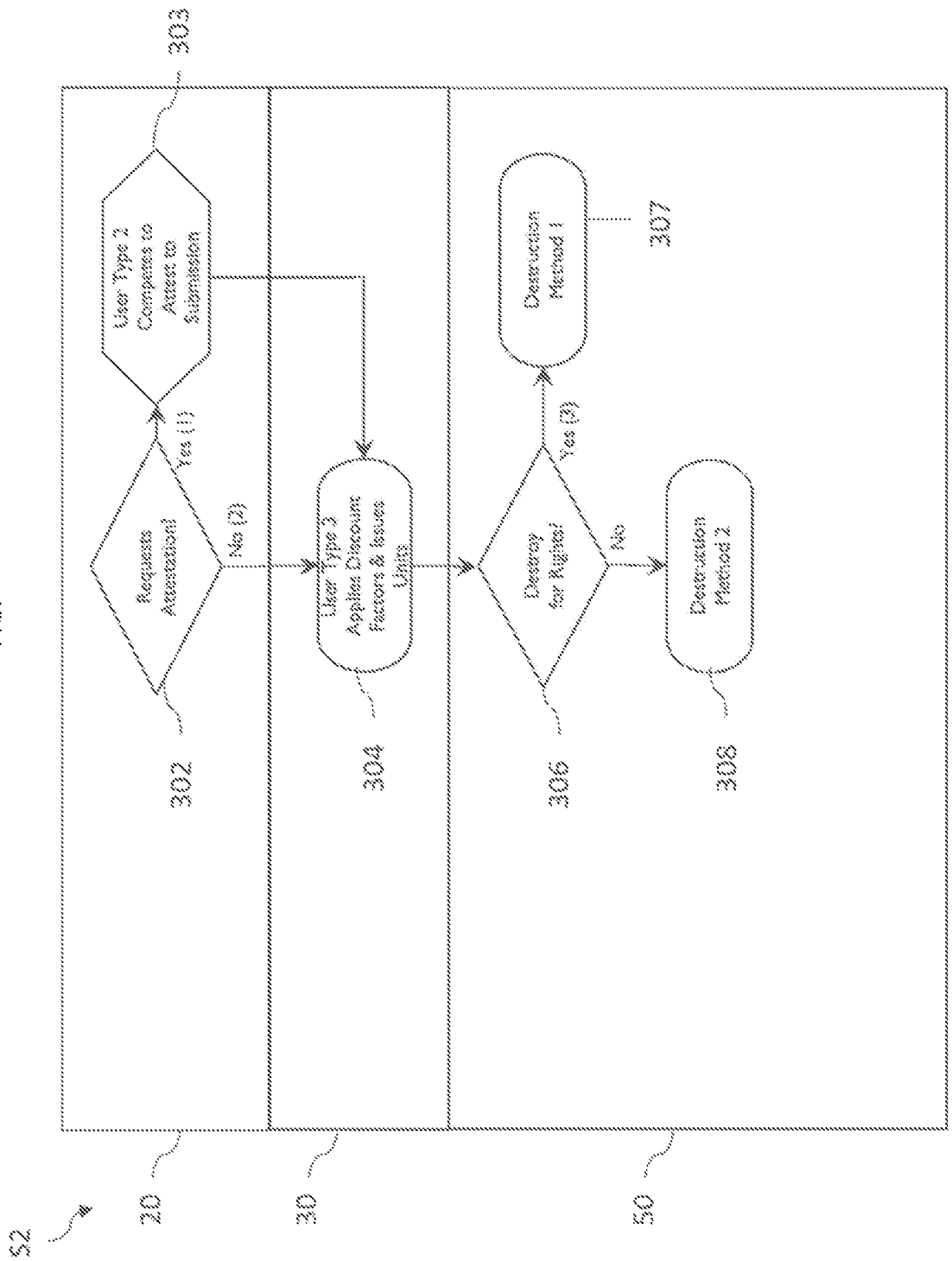

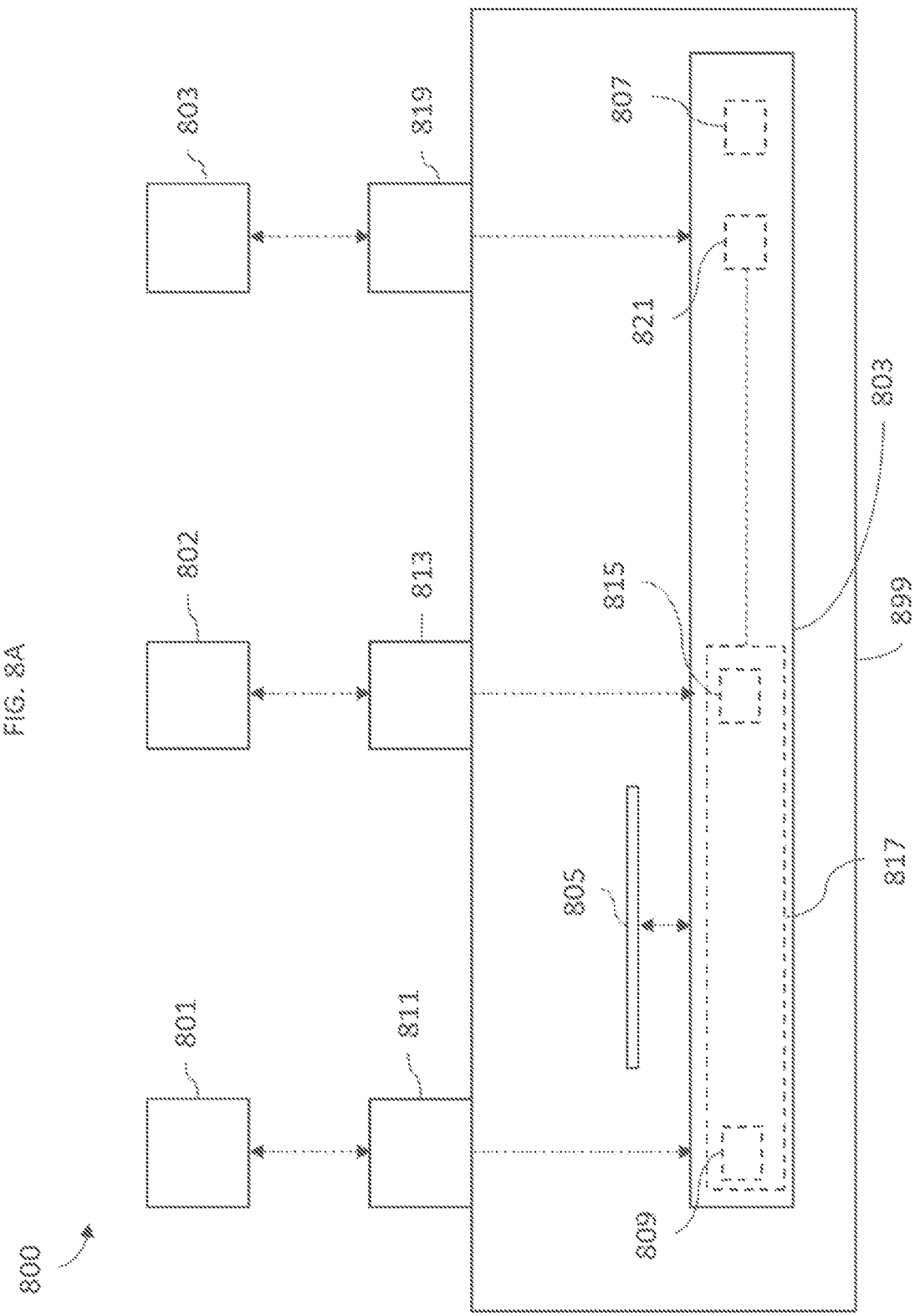

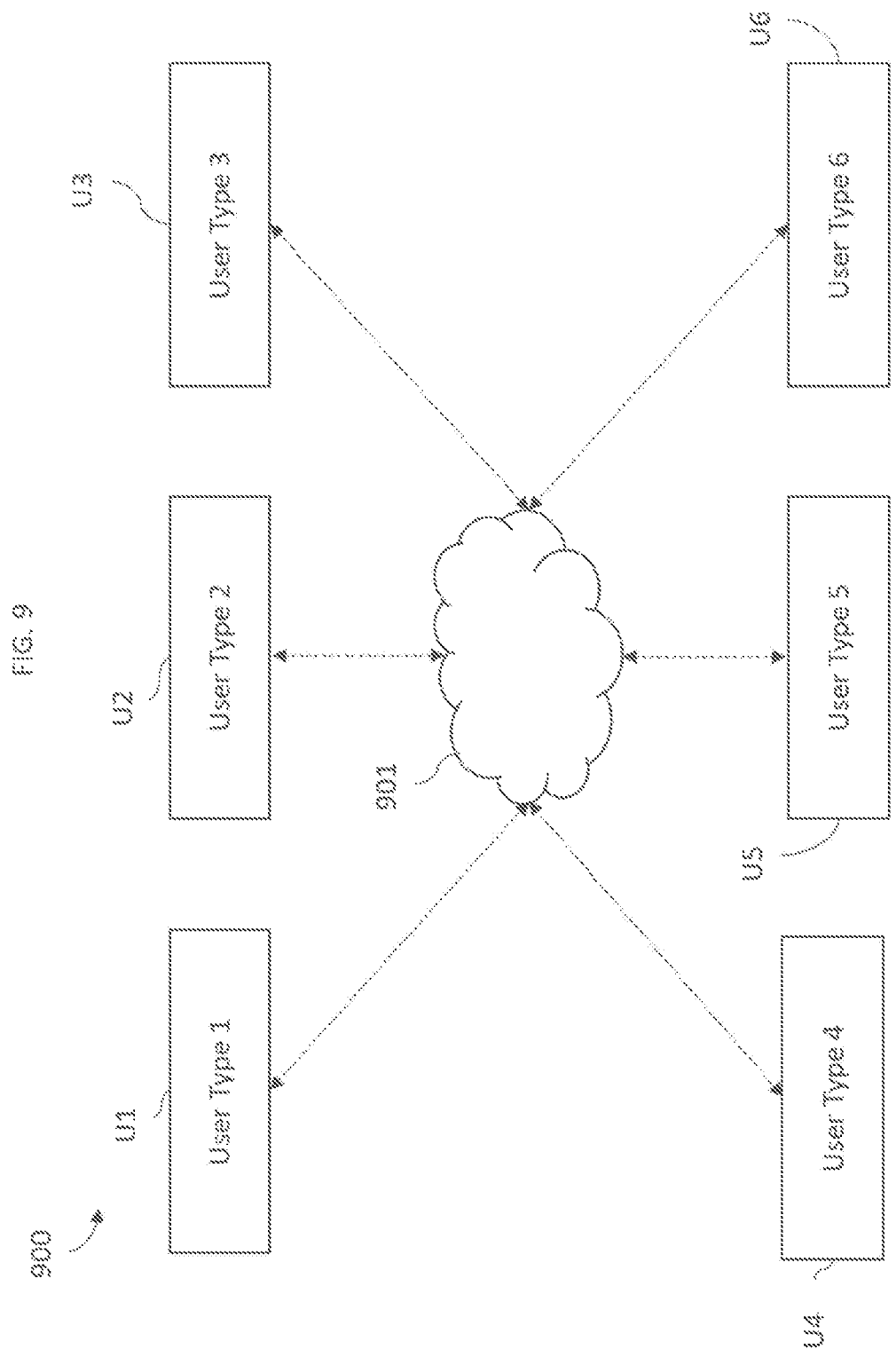

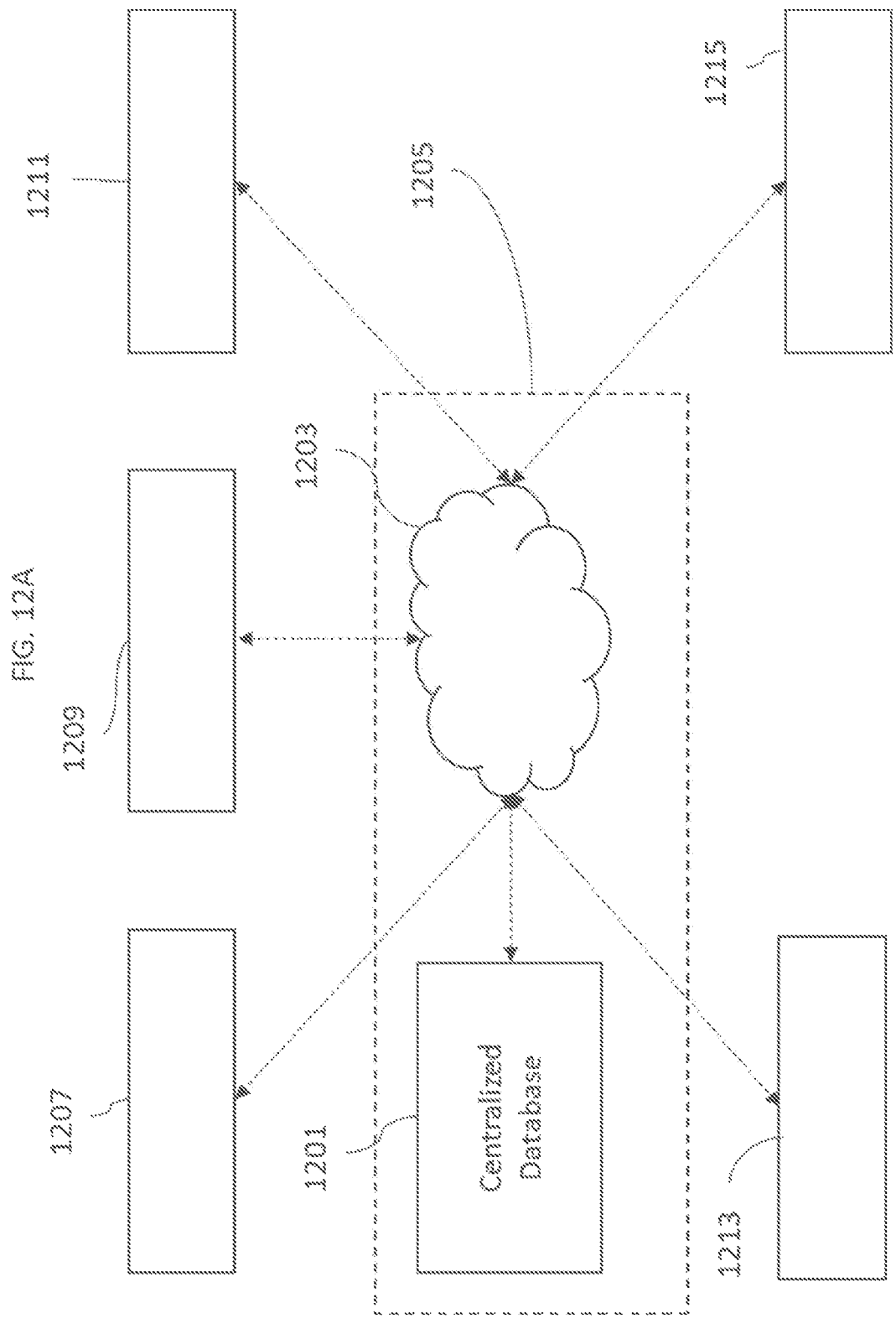

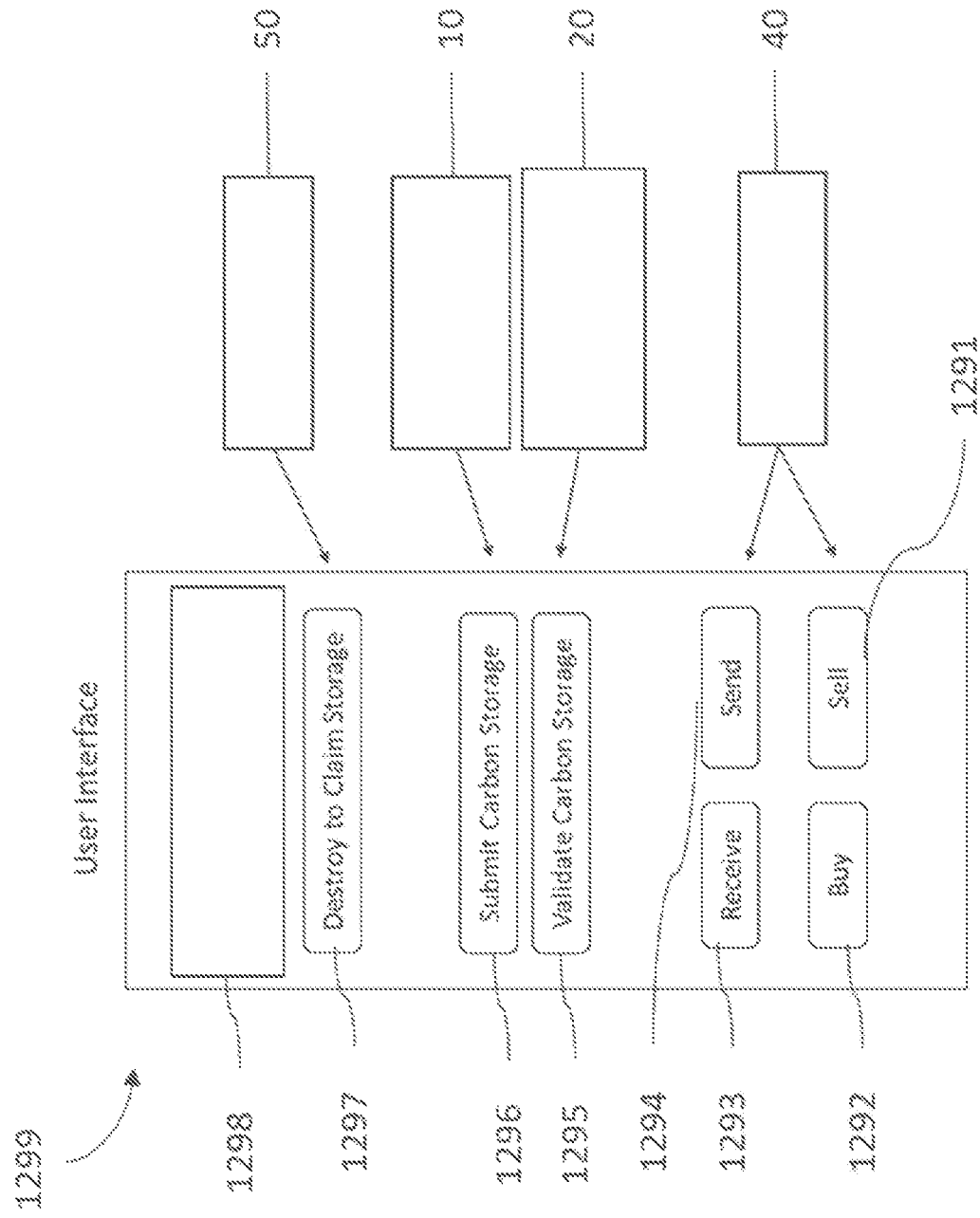

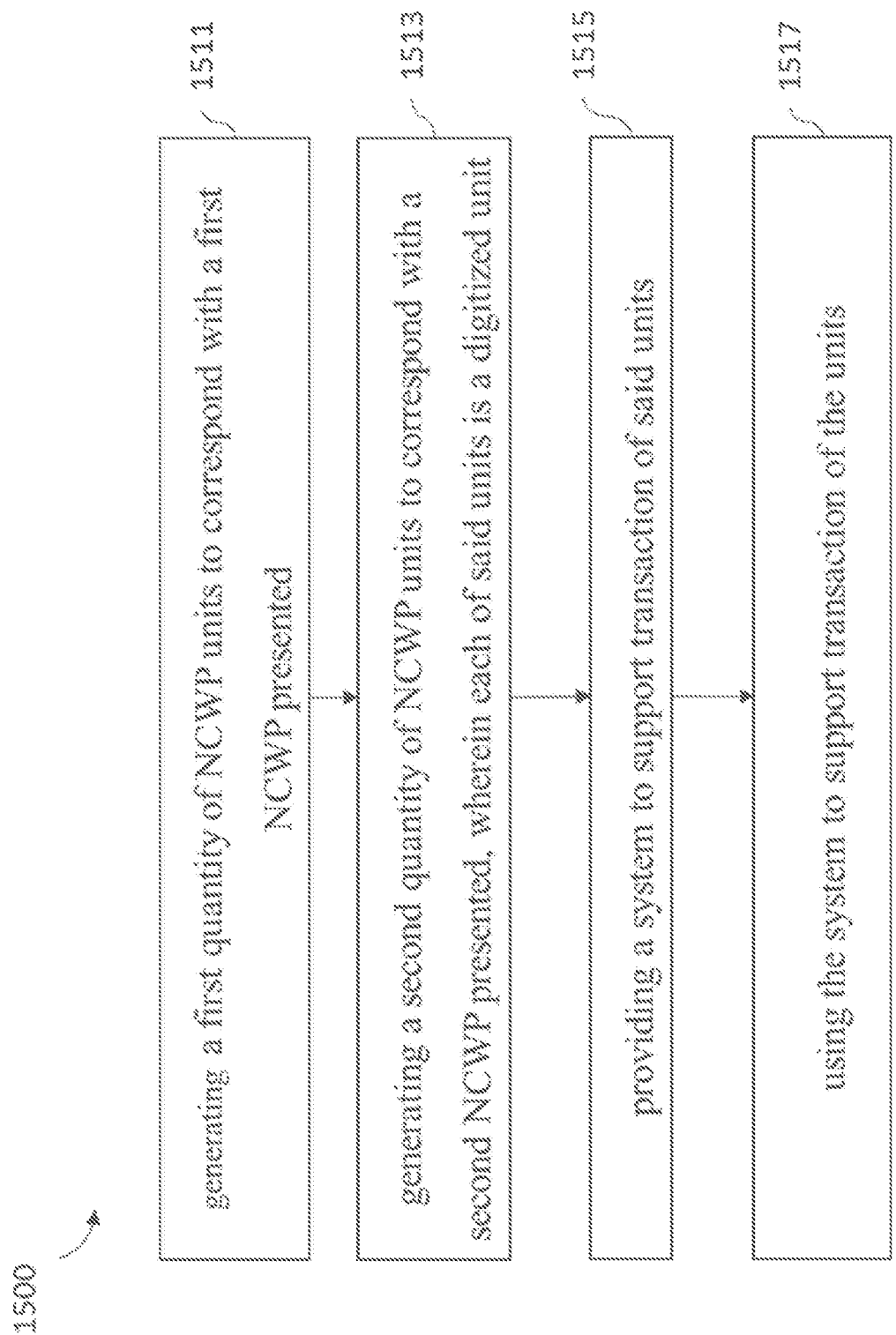

FIG. 16

- 1600 perform an NCVP
- 1601 submit a claim for Units based on the NCVP
- 1602
- 1603 receive the claim for Units based on the NCVP
- 1604
- 1605a validate the claim for Units
- 1605b apply a discount factor to the claim for Units
- 1606 apply a discount factor to the claim for Units, and determine the number of Units that correspond to the claim for Units
- 1607 issue the determined number of Units

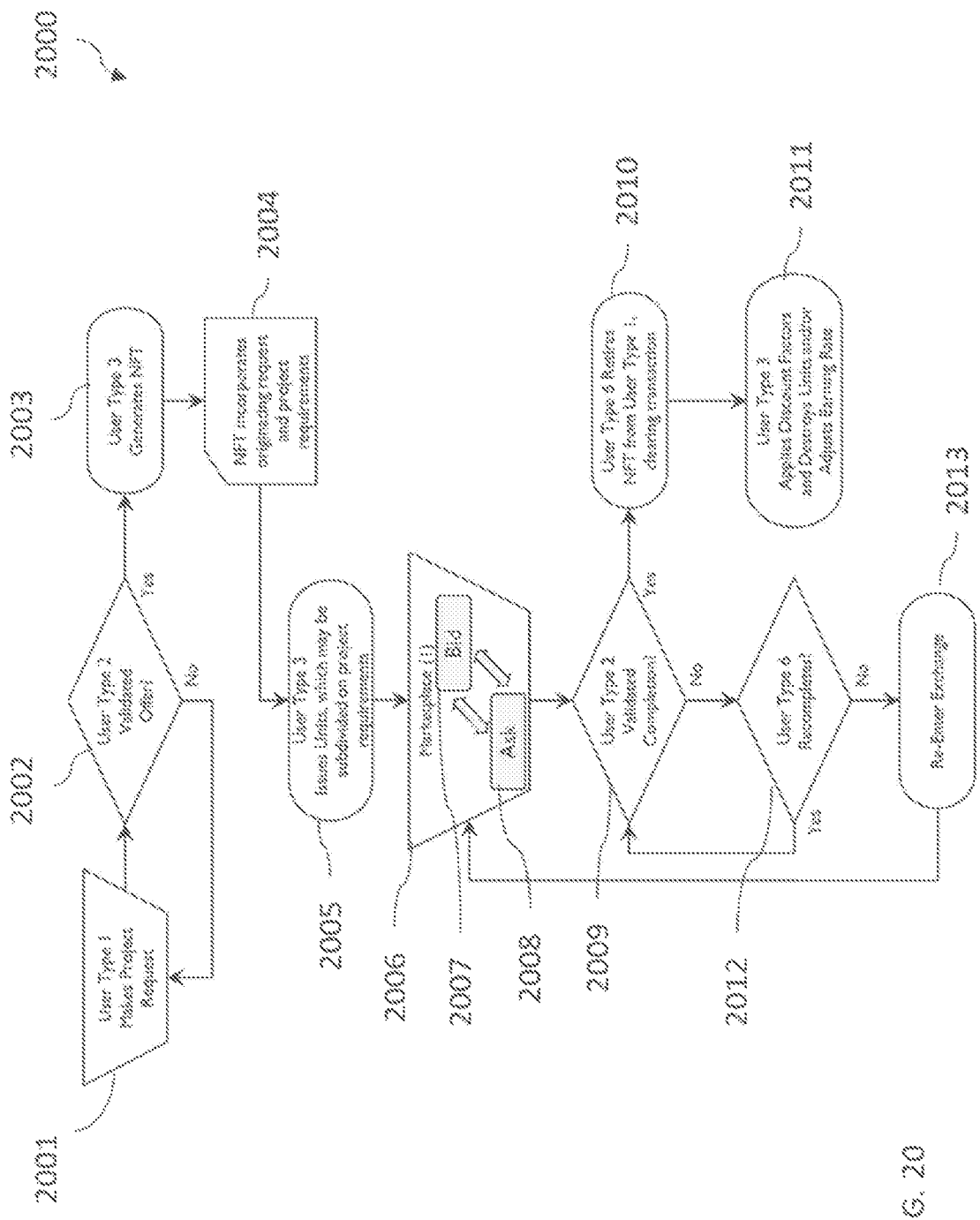

SYSTEMS AND METHODS FOR TRANSACTING OF UNITS DERIVED FROM NON-COMMODIFIABLE WORK PRODUCTS

CROSS-REFERENCE TO RELATED APPLICATIONS

The present application claims the benefit of (and priority to) United States Provisional Patent Application No. 63/105,220 (pending), filed on Oct. 24, 2020, which is hereby incorporated by reference in its entirety and for all purposes, and made a part of the present disclosure.

FIELD

The present disclosure relates generally to systems, apparatus, methods, processes, and articles for supporting, handling or manipulating transactionable units or records derived from non-commodifiable work products, and the like, and transactions thereof, including the creation and maintenance of said units or records. To facilitate description, these activities are sometimes collectively referred to herein, in respect to such Units, as transacting said Units or Unit transactions.

BACKGROUND

Current market systems and technologies may be well equipped to handle Work Products that are physical in nature, physically transferable, and/or are deliverable to a specific location at a specific time. Some Work Products are not physically embodied, however, and lack any meaningful concept of delivery and/or delivery time. Such a Work Product is referred to as a Non-Commodifiable Work Product ("NCWP"). These NCWPs present challenges for exchange under current, organized markets, or, under currently available technologies.

An example of an NCWP relevant to this disclosure is one associated with the removal of a measurable quantity of carbon dioxide from the atmosphere. While carbon dioxide is a physical, measurable molecule, the absence of carbon dioxide is not. In any event, there is value in the right to claim the known and expected benefits directly associated with this NCWP, but current market systems and technologies have challenges in supporting such transactions with the requisite transparency, traceability, and accountability, ease, and other attributes demanded of traditional commodity-based transactions. Consequently, there is not any viable marketplace for NCWP rights.

It would be desirable to have systems, apparatus, methods, and articles for handling units or records derived from such non-commodifiable work products, and supporting transactions thereof or therefor, and for multiple types of users.

BRIEF SUMMARY

There are "markets" in which NCWP-related rights may be transferred between individuals or entities, but these markets typically lack desirable structure and organization. These markets also typically lack transparency because the markets often purposefully veil important differentiating factors and do not often verify those differentiating factors. Addressing these underlying problems, and introduced herein, are systems and processes that uniquely support transactions involving NCWP-related rights and are equipped with market-like functionalities. This is accomplished, at least partly, through the generation of standardized units derived from NCWP data, referred to now as "NCWP Units" or "Units". The creation of these NCWP Units is preferably directed through a third-party attestation or validation process, and includes applying transparent Discount Factors, which enhances the trustworthiness (and therefore the inherent value) of the Units based on NCWPs. This is particularly important when the underlying Work Product is non-physical and/or has a negative quantification.

In one aspect, the present disclosure relates generally to a system or apparatus (sometimes referred to herein as a system and, other times, as an apparatus) and method of representing and then transacting or manipulating certain types of rights or obligations, and to a product or article derived from or an object of such systems and methods. The present disclosure is particularly applicable to articles and methods directed to a non-commodifiable work product. It should be noted that the following description may simply refer to or describe concepts in terms of a system or method or process, but such reference should not be considered as limiting. It will become apparent that other important aspects may reside in related products, articles, apparatus, processes, and techniques pertaining to transactions of said Units, and, more particularly, NCWP Units. To facilitate certain processes, the Unit (and the method of creating the Units) is preferably digital or digitized.

Described herein are methods, processes and subprocesses, programs, and techniques that embody aspects of the disclosure, and entail an advantageous and unique manipulation of digitized records or units. Also described are systems, programs, executable instructions, and the system, apparatus, programs and storage media containing or executing, at least partly, such instructions, graphical user interfaces and electronic platform, and articles, among other things, the use or operation of which may involve generating, accessing, storing, transforming, and/or otherwise manipulating or handling such Units. To facilitate the present description, specific, exemplary embodiments or applications are described. Furthermore, the description that follows may refer only to a system, method, or an article, or a user interface, and not to other broad or specific aspects, and variations.

In one application, a system and a method are described which allows for the creation and exchange of commodities from former NCWPs by: (i) validating measurements of NCWPs; and (ii) issuing Units based on those measurements after application of Discount Factors. The system and method also provides for: (iii) the exchange or transfer of Units between and among participants within a market. Finally, the system and method provides for: (iv) the conversion of Units to and from subdivisions; and (v) the destruction of Units for the purpose of establishing the right to claim the original NCWP. The system and method provide for the performance of these actions in a traceable and indisputable manner. To illustrate, one aspect of the disclosure is directed to a system and method of generating an article, a Unit, as well as the Unit or article itself. In its proper context, as described herein in association with certain, preferably digitized systems and processes, the Unit becomes a marketable asset.

In one application, such systems, apparatus, and methods are implemented to: (i) apply a standardized process and set of factors such as, for example, originating location of the Work Product, probability functions related to the Work Product, validator approval of a claim to the Work Product, and the application of Discount Factors to the Work Product; and (ii) to create standardized fungible tradeable "Units" in view of the Work Product. Furthermore, such Units may be described in terms of such Discount Factors, or properties. In exemplary methods or techniques for manipulating or handling (e.g., transacting) digital Units, a User (e.g., an NCWP producer) may receive digital Units, and then relinquish the rights to claim the originating NCWPs, so that those rights can, instead, be vested in the Units (i.e., the transfer of those Units transfers the rights to the NCWPs). As well, Users may: (iii) exchange or transfer Units within a market system. User participants may also: (iv) convert and/or (v) destroy (cancel) the Units. Within an exemplary system, the conversion of Units effects the subdivision of Units and, further, the removal of originating Units from the market system, while the destruction of Units grants a current holder a right to claim the NCWP that is vested in the Units.

As used herein, the term "transactions" or "transacting"," as it relates to a Unit or record within a system or apparatus of the present disclosure, means that the Unit or record represents rights to an NCWP and that the Unit or record may be the object of a system or user action that results in the issuance/receipt, transfer, exchange, destruction, or modification of the Unit or record (e.g., subdivision).

As used herein, the terms "destroy," "destruction," or derivations thereof mean any method or means that renders Units invalid (for example, placing them into an account where they can no longer be transferred or deletion of records representing the Units).

As used herein, the term "right to claim" or derivations thereof means the right to claim the NCWP itself, the right to claim the rights earned by performance of the NCWP (e.g., legal benefits, tax credits, tax avoidances, etc.), or both.

BRIEF DESCRIPTION OF THE DRAWINGS

So that the manner in which the features and advantages of the system and/or methods of the present disclosure may be understood in more detail, a more particular description briefly summarized above may be had by reference to specific implementation of the system, method and product/article that are illustrated in the appended drawings. It is to be noted, however, that the drawings illustrate specific implementations for illustration and are therefore not to be considered limiting of the disclosed concepts as it may include other, effective applications as well. It is noted, as well, that certain, other applications may employ less than all of the different aspects described below.

FIG. 1 is a simplified system diagram illustrating Unit transacting techniques and subprocesses, according one aspect of the present disclosure;

FIG. 2B is a simplified process flow chart illustrating basic Unit transacting techniques and subprocesses, according one aspect of the present disclosure;

FIG. 2C is a simplified process flow chart illustrating Unit transacting techniques and subprocesses, according one aspect of the present disclosure;

FIG. 3 is a simplified system diagram illustrating Unit transacting techniques and subprocesses, according one aspect of the present disclosure;

FIG. 4 is a simplified system diagram illustrating Unit transacting subprocesses of FIG. 3, according one aspect of the present disclosure;

FIG. 8A depicts one exemplary system suitable for the creation of and destruction of Units using a centralized database, according to one aspect of the present disclosure;

FIG. 8B is a flow chart of an exemplary process from creation to destruction of a unit, according to one aspect of the present disclosure;

FIG. 9 depicts one exemplary system suitable for the creation and destruction of Units using a decentralized database, according to one aspect of the present disclosure;

FIG. 12A depicts one exemplary system suitable for the creation and destruction of Units using a combination of a centralized and a decentralized database, according to one aspect of the present disclosure;

FIG. 12B depicts a user interface for interacting with a database, according to one aspect of the present disclosure;

FIG. 15 is a flow chart of an exemplary process, according to one aspect of the present disclosure;

FIG. 16 is a flow chart of an exemplary process, according to one aspect of the present disclosure;

FIG. 20 is a schematic of a reverse process in which NCWP is requested and bid upon by other users, according to one aspect of the present disclosure;

DETAILED DESCRIPTION

Figure 2A:
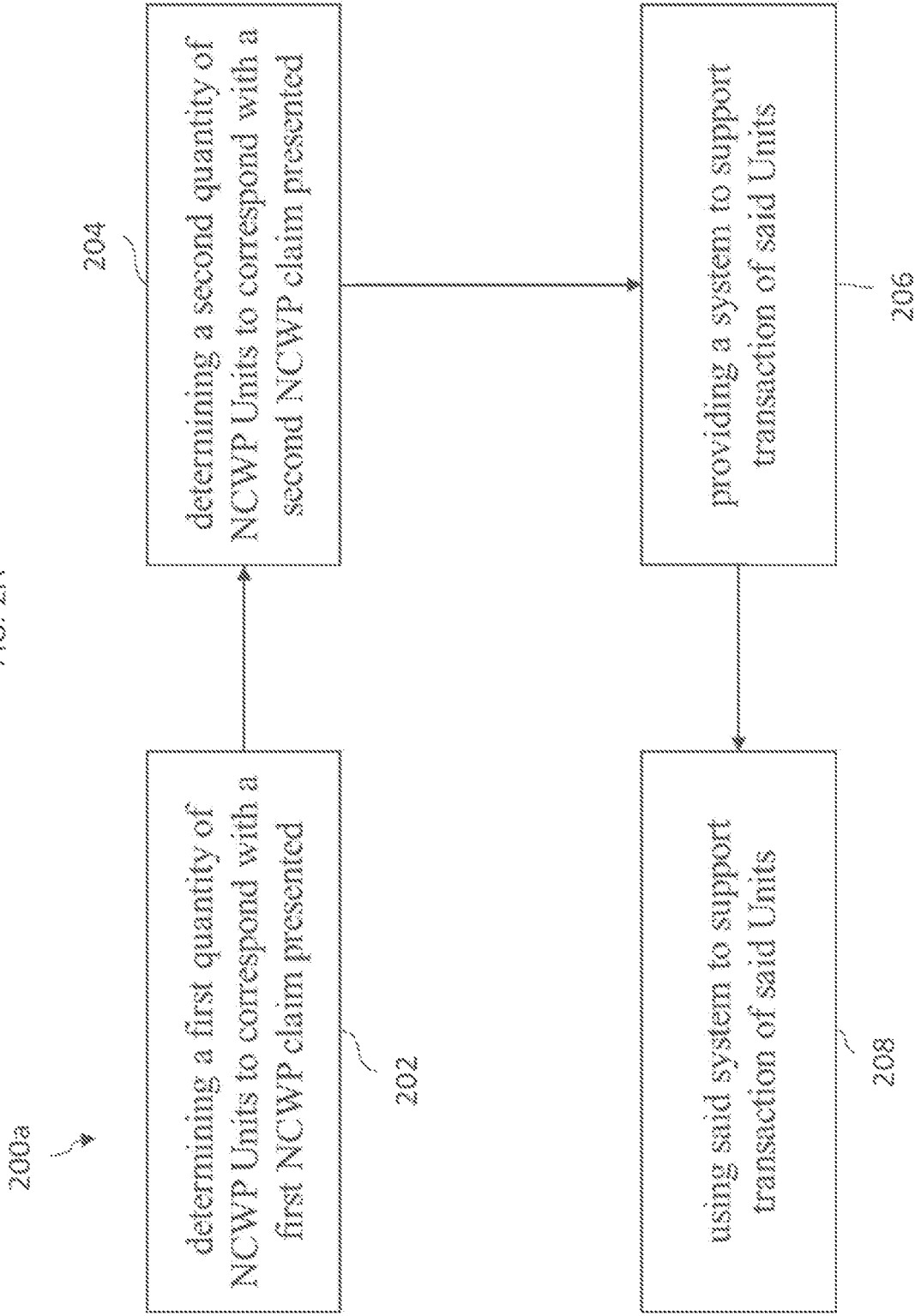
FIG. 2A is a simplified process flow chart illustrating basic Unit transacting techniques and subprocesses, according one aspect of the present disclosure.

The following provides a description of various aspects of the disclosure, particularly in respect to Non-Commodifiable Work Products, and more particularly, a system and method for supporting (and facilitating) the transaction of standardized, tradeable units representing such NCWPs ("NCWP Units" or "Units"). The present disclosure also introduces, as a further aspect, a system and method for the generation or creation of a Unit or a population of Units, which are preferably, tradeable, fungible units representing NCWPS, and the Unit article of manufacture or creation itself. Such a method preferably includes the receipt of NCWP data (multiple instances), applying discount factors to determine the amount or quantity of standard units to issue in correspondence with the submission, and issuing the units accordingly, wherein, the determination of the amount or quantity of units most preferably include receiving attestation from a third-party validator (based on the received NCWP data), and then applying discount factors including consideration of said attestation/validation results. To facilitate illustration of more detailed features, current systems are first described, and certain concepts and embodiments are introduced in the context of this initial description. It should be understood, however, that the systems, methods, and articles that make the present disclosure are not necessarily tied to or limited by the description of existing systems and processes. That description may, however, add context, insight, or definition, in some cases, to terms and concepts introduced herein as part of the present disclosure.

Systems and methods according to the present disclosure are configured to support the creation and exchange of commodities from former NCWPs by: (i) validating measurements of external Work Product; and (ii) issuing Units based on those measurements after application of standardized Discount Factors. These systems and methods are also configured to support: (iii) the exchange or transfer of Units between and among participants within a market. Furthermore, these systems and methods are configured to support: (iv) the conversion of Units to and from subdivisions; and (v) the destruction of Units for the purpose of establishing the right to claim the original Work Product. In one exemplary application, the system and process is defined by separate identifiable but inter-operable components that are configured to support the activities outlined above. In one aspect, the systems and methods disclosed herein can be implemented (e.g., implementation of (i)-(v)) in a traceable and indisputable manner, such as via use of a blockchain system.

To illustrate and highlight the contributions made to the state of the art(s) provided by these concepts, the focus of this specification may be placed on exemplary systems, methods, techniques, and devices for generating, manipulating, and/or transacting Units representative of Carbon Credits. Further, much of the detailed description focuses on Units that are created and supported on a digitized, electronic, networked system. Such description and specificity should not be limiting, however, as variations of the disclosed concepts and applications, and/or their application in other environments and manner will be apparent to one of ordinary skill in the relevant art and with access to the present disclosure. In describing the various exemplary systems and processes, and in respect to such Units in or about the system, the present description will use the term transacting or handling to refer to such activities, the object of which are the Units, as creating, modifying (including dividing), assigning, maintaining or storing, trading or exchanging, transferring, destroying and other accounting and trading activities.

In one respect, the present disclosure introduces systems, articles, and methods directed to the formation of distinct market systems and operations within the market systems that provide for the effective commoditization of NCWPs. Where a market already exists for a Work Product, systems and methods disclosed herein may increase efficiency and market participation within such existing markets.

In one aspect, the systems, methods, and articles introduced herein enable the traceable and/or indisputable creation, exchange, conversion, destruction, or transfer of Units that represent NCWPs. Systems and methods introduced herein preferably provide for transparently standardized digitized Units, more preferably by incorporating third-party validation into the process of earning Units. Whereas, existing technologies, at best, allow for third-party validation of the physical characteristics of the underlying Work Product, the present systems and methods disclosed herein also allow for third-party validation of the underlying methodologies and technologies used to generate that Work Product.

Fungibility for the Unit of Exchange

Existing technologies and systems identify specific attributes of the tradeable commodity. Any deviations from that standard affect the value of the physical product upon delivery. Systems and methods according to the present disclosure generate and accommodate a commodity (Units) after the application of Discount Factors to varying qualities of NCWPs. This results in the issuance of fungible Units and standardizes the Units of exchange in advance of trading.

Clear Transfers of Title for NCWPs

Current commodity markets have specific requirements for Work Products, which present challenges for commoditization of many NCWPs. Existing technologies effect the transfer of ownership rights to the Work Product upon execution of transfer. The systems and methods disclosed herein, instead, effects, instead, the timing, transferring, and granting of verifiable and indisputable rights to claim the original Work Product, represented by a Unit, upon destruction of the Unit (alternatively, destruction of a Unit could transfer the obligation to undertake efforts to produce a requested Work Product or signify the completion of a requested Work Product, that was used to generate the Unit). Destruction of Units, which results in a final claim to the rights associated with the Work Product, eliminates the need for a timed delivery component and allows NCWPs to be purchased and sold without the use of physical transfers (which are often impossible), or future timing obligations.

Market Differences and Improvements

Standard Commodity Contracts

For all current commodity markets, there is a standard commodity $\vec{C}_{mkt}=(l, c, t, u, z_1, \ldots, z_n)$, defined by market contracts that include requirements for location, quantity per contract, delivery date, quality, and other factors ($z$), respectively. Spot prices reflect the value of the standard commodity.

Products supplied to and by the market are likely to deviate from $\vec{C}_{mkt}$. We can write these products as:

$$\vec{C}_i = (l_i, c_i, t_i, u_i, z_{1_i}, \ldots, z_{n_i}) =$$
$$(l + \Delta l_i, c + \Delta c_i, t + \Delta t_i, u + \Delta u_i, z_1 + \Delta z_{1_i}, \ldots, z_n + \Delta z_{n_i}).$$

Component contributions to delivered prices ($P_{del}$) are indiscernible in the market such that:

$P_{del_i}|\vec{C}_i = P_{del_{i+1}}|\vec{C}_{i+1} \not\Rightarrow \vec{C}_i = \vec{C}_{i+1}$, in fact, $\vec{C}_i \neq \vec{C}_{i+1}$ is often the case.

Units Commoditized

Exemplary methods and techniques according to the present disclosure convert all participant Work Products to Units. This is achieved by applications of Discount Factors to determine tradeable quantities of Units earned by each company ($q_{u_i}$):

$$q_{u_i} = q_{\vec{C}_i} \cdot d_U(\vec{C}_i),$$

where $q_{\vec{C}_i}$ is the amount of non-Unitized commodity produced by company i, and $d_u$ is a discounting function. In general, $q_{u_i} \neq q_{\vec{C}_i}$.

The function $d_u$ is designed to normalize all Units (note: this function adjusts quantity rather than price) to a single meaningful standard by accounting for variations in location, quantity per contract, delivery date (which is often irrelevant), quality, and other factors, when determining the tradeable quantities earned by producers. Under this system, c can be a negative number, and z can include components like probabilities leading to expected values. To avoid loss of generality: this model can also incorporate many other, formerly difficult or impossible, variations and attributes when determining $q_{u_i}$. In some embodiments, the present disclosure relates to the application of discernible algorithms to create Units.

In one aspect, implementation of systems and methods described herein advantageously reduces potential market confusion by ascribing discernible composite functions to normalize tradeable quantities in advance of trading. By standardizing tradeable Units, the Units may have the same delivery price.

Standard Market Equilibrium

In the equations in this disclosure, constants are bolded and independent variables are not bolded.

The current equilibrium spot price, $P_{eq}$, for the commodity $\vec{C}_{mkt}$ is simultaneously determined by the market conditions:

$$Q_D = f_{mkt}(P_{eq}|\vec{C}_{mkt}),$$
$$Q_S = \sum_{i=1}^{n} q_{\vec{C}_i}, \text{ and}$$
$$q_{\vec{C}_i} = \Pi_{mkt_i}(P_{eq}|\vec{C}_{mkt}),$$

where $Q_D$ and $Q_S$ are the market demand and supply respectively, $f_{mkt}$ is a demand function, and $\pi_{mkt_i}$ is company i's individual profit function (in its most basic form this would be total revenue minus total cost). Under equilibrium conditions, $Q_D = Q_S$. (To avoid confusion, $P_{del_i}|\vec{C}_i$ means the delivered price of commodity i, given the parameters of commodity i. Simply said: this is the price you get, on delivery, for a commodity with commodity i's parameters.)

As described above, $P_{del}$ is the price of the commodity upon delivery (for example on the exercise of a long futures contract). It is determined by:

$$P_{del_i} = P_{eq} \cdot d_{mkt}(\Delta l_i, \Delta c_i, \Delta t_i, \Delta u_i, \Delta z_{1_i}, \ldots, \Delta z_n),$$

where $d_{mkt}$ is a price discounting function that accounts for any deviations from the standard contractual requirements. For example, if a seller delivers 100 troy ounces of 18-carat gold when the market commodity standard contract requires 100 troy ounces of 24-carat gold, then 100 troy ounces of 18-carat gold will receive a lower price (roughly 75% of the standard contract price).

Unit Market Equilibrium $P_U$ is the current equilibrium price for a standardized Unit under our disclosure. Like $P_{eq}$ under standard conditions, $P_U$ is simultaneously determined by the market conditions below. The relationship changes as follows:

$$Q_D = f_U(P_U),$$
$$Q_S = \Sigma_{i=1}^{n} q_{\vec{C}_i},$$
$$q_{\vec{C}_i} = \Pi_{U_i}(P_U),$$
$$q_{u_i} = q_{\vec{C}_i} \cdot d_U(\vec{C}_i), \text{ and}$$
$$Q_U = \Sigma_{i=1}^{n} q_{u_i},$$

where $f_U$ is a Unit demand function, $\pi_{U_i}$ is company i's individual profit function (in its most basic form this would be total revenue minus total cost), and $Q_U$ is the market supply of Units.

The new resulting equilibrium occurs when $Q_D = Q_U$ (typically $Q_S \neq Q_U$), and, because of this standardization, under all conditions $P_{del} = P_U$. For example, if the market defined a Unit as equivalent to 100 troy ounces of 18 carat gold at a specific location. Under this example, the market would also grant a Unit for 75 troy ounces of 24 carat gold or any other equivalent amount at the same location. Thus, Gold Units, the underlying asset, have the same price in this Unit Market; and differentiating factors are both transparent and inherent in Unit quantification. (This example serves only to illustrate a concept according to the present disclosure, noting that, unlike NCWPs targeted by concepts introduced in this disclosure Gold is physically transferable and has delivery dates and locations that have meaning).

Preferred systems and methods also provide the opportunity for derivatives markets (such as options and futures contracts), which would not, otherwise, be readily available for NCWPs.

System

FIG. 1 depicts an exemplary system 1, or apparatus, for transacting a tradeable Unit representing a noncommodifiable work product, according to some embodiments of the present disclosure. FIGS. 2A-2B present flowcharts corresponding to basic processes of transacting the tradeable Unit (e.g., process for using the system 1 to create Units, maintaining the Units within system 1, and to issue Proofs of claim or proof of rights so as to confer the rights to claim the underlying NCWP). FIG. 3 is a simplified diagram of an exemplary method of transacting a tradeable Unit in stages facilitated through use of system 1 and, more particularly, distinct functionalities of system 1, characterized as system components. System 1 is preferably an electronic, networked system (e.g., computer-based system) that includes centralized database 2. Centralized database 2 includes a non-transitory data storage 3 (e.g., including a ledger stored therein) and processor 4 (e.g., CPU) in communication with the data storage 3 for executing computer instructions stored in data storage 3. Data storage 3 includes software 5 stored therein. Software 5 includes computer instructions for implementing one or more steps of the processes disclosed herein; facilitating communication between user devices 19, 29, 39, 49, and 59; and/or facilitating user devices in implementing one or more steps of the processes disclosed herein. User devices 19, 29, 39, 49, and 59 interact with centralized database 2 through user infaces 11, 21, 31, 41, and 51, respectively. While the centralized database 2 is shown as a discrete structure from user devices 19, 29, 39, 49, and 59, in other embodiments one or more of the user devices 19, 29, 39, 49, and 59 functions as the centralized database 2. The centralized database 2 and user devices 19, 29, 39, 49, and 59 may be in communication via wired or wireless communication.

Methods

In a basic process for implementing concepts introduced by this disclosure, as discussed further below, a database containing a ledger is used to maintain, store, and account for Units, attestation/validation information, applied discount factors information, user information, and the relations between this data (see, e.g., FIGS. 21A and 21B). FIGS. 2A-2C show various basic methods of transacting a transferable NCWP Unit, according to the present disclosure. The methods disclosed herein may facilitate: (i) generation of units that correspond with NCWP claims; (ii) validation and attestation of the NCWP claims; (iii) application of standardized discount factors to the NCWP claims; (iv) provision of standardized units that each correspond with the same quantity of NCWP; (v) transactions of units amongst a plurality of users to provide for the buying and selling of units; and (iv) the provision of proofs of claims to an NCWP with an associated destruction of units. Referring to FIG. 2A, method 200a is one exemplary method of transacting a tradeable unit representing a noncommodifiable work product. Method 200a includes determining a first quantity of NCWP Units to correspond with a first NCWP presented, step 202. A first user may present the first NCWP claim to the system, and the quantity of units may be determined based on the claim, validation, and discounting factors. Method 200a includes determining a second quantity of NCWP Units to correspond with a second NCWP presented, step 204. Each of the determined NCWP Units are standardized, preferably digitized, Units. Method 200a includes providing a system to support transaction of said Units, step 206. Each of said digitized Units is equivalent to every other of said other digitized Units. Thus, the Units are standardized (i.e., standardized, fungible Units). Method 200a includes using said system to support transaction of said Units, step 208. Using said system to support transaction of said Units includes drawing a number of units from said accounting of units to satisfy a transaction. Thus, the methods disclosed herein may including keeping a ledger of units generated and units destroyed. FIG. 2B depicts another exemplary method of transacting a tradeable unit representing a noncommodifiable work product. Method 200b includes receiving a claim submission for Units representing an NCWP, step 220. Method 200b includes determining a units value for the claim submission, including applying discount factors, step 222. Method 200b includes repeating the receiving and determining steps to record a population of units representing NCWP, where each unit is equal in value to all other units, step 224. Method 200b includes destroying a Unit and issuing a proof of claim to the NCWP, step 226. FIG. 2C depicts another exemplary method of transacting a tradeable unit representing a noncommodifiable work product. Method 200c includes receiving a claim submission for Units representing an NCWP, step 230. Method 200c includes receiving an attestation of the claim submission, step 232. Method 200c includes determining a Unit value for the NCWP after application of Discount Factors, step 234. Method 200c includes providing a system to support transaction of said Units, wherein every unit transacted is identified as equal in value to every other unit transacted, step 236. Method 200c includes issuing a proof of claim to the NCWP and destroying the associated number of Units, step 238.

Users

Users relevant to the concepts and applications introduced herein include businesses and individuals who effect or cause a transaction involving the NCWP Unit. These include entities that desire or have been commissioned to commodify NCWPs, validate NCWP creation, obtain, transfer, or exchange NCWPs, and/or claim the original NCWPs as their own, for present purposes, this collection of actions are considered transactions on, of or involving the NWCP. Table I below provides an exemplary list of six (6) primary users—business entities and/or individual entities, systems, nodes, component operators, and custodians. As suggested in FIG. 1, the exemplary system 1 is structured with components or subcomponents configured to interface with one of more of these users and facilitate the NCWP Unit transactions. Throughout the description, reference will be made to these User Types and, more simply, Users 1-6.

TABLE I

Users

| USER TYPE | FUNCTIONAL DESCRIPTION OR ACTIVITY |
|---|---|
| 1 | NCWP and Claim Origination |
| 2 | Attestation/Claim Validation |
| 3 | Create/Issue Units |
| 4 | Support Transaction of Units |
| 5 | Transference of Rights to claim NCWP |
| 6 | Effect Destruction of Units/Claim NCWP |

Type 1 Users undertake efforts that result in NCWPs, including presenting critical NCWP data to the system to claim Units associated with the underlying NCWP. For example, after performing work that results in the reduction of carbon dioxide into the atmosphere, a Type 1 User may submit a claim for Units associated with the underlying NCWP, including information such as the date of the work, the location of the work, and other factors that are relevant to the work and the associated reduction in carbon dioxide in the atmosphere. Type 2 Users are responsible for attesting to and thereby, validating NCWP claims submissions, by reviewing information submitted by a Type 1 User. After receiving the attestation and validation information from a Type 2 User, a Type 3 User determines and then issues Units to the Type I User. In determining the number or Units to assign to the NCWP submission, a Type 3 Users may apply "Discount Factors" to NCWPs. For example, a certain amount (e.g., tonnage) of carbon dioxide removed from the atmosphere may be associated with a certain number of Units, in accordance with a standardized conversion from an amount of carbon dioxide to a number of Units. However, depending on the particulars of the claim submission, NCWP, and/or associated User Type 1, the number of Units associated with the amount of carbon dioxide removed from the atmosphere may be modified (e.g., reduced) by applying Discount Factors to the number of Units. A Type 3 User may also destroy Units upon request from a Type 6 User for a proof of claim. Type 4 Users confirm, review, and record transactions among Type 1, 2, and 3 Users. Thus, Type 4 Users may facilitate transactions (trades, buys, sells) of Units amongst Types 1, 2 and 4 Users. Turning to Type 5 Users, these users participate in the purchase, exchange, and/or transfer of Units with other Type 5 Users, or act to convert Units to and from smaller denominations of Units (or the reverse). Finally, Type 6 Users submit Units to be destroyed by the system for the purpose of establishing the Type 6 User's final, indisputable claim or right to claim to the original NCWPs that resulted in the issuance of the Units that are being destroyed. Any person holding title to a Unit can be a Type 6 User and can request Unit destruction.

In various applications and variations, the system may be equipped with one or more user interfaces to support user's engagement with the system. In the descriptions that follow, separate and dedicated graphical user interfaces are identified, but it will become apparent to one skilled in the art and provided with the present disclosure that a number of combinations of user interfaces may be used and configured to facilitate the described user-system engagement and processes. It will also be apparent that certain User Types are representation of actors that initiate system activities, but these actors may be individuals, entities, programs, or a triggering action or effect recognized by the system.

Suitable, exemplary systems and methods are now described in more detail, which apply to or support tradeable, fungible NCWP Units derived from Work Product arising from the removal of carbon dioxide from the atmosphere. This focus on carbon removal is provided to show the present disclosure's contribution to the art and to highlight the particular benefits to implementation of an exemplary system such as that shown in FIG. 1. Notably, the measure or valuation associated with this particular non-commodifiable work product is generally susceptible to double counting and double spending. Existing systems for reporting, tracking, and/or claiming carbon dioxide removal are not usually based on physical, real-world efforts of carbon dioxide removal. Claims for carbon dioxide removal, and associated benefits, are often submitted to multiple places for multiple purposes and, thus, often overstate the actual amount of carbon dioxide actually removed from the atmosphere. With this disclosure, each Unit is a discounted, preferably digital representation of a physical, real-world result from efforts to remove carbon dioxide from the atmosphere. The present disclosure also introduces a method (and subprocesses) for destroying a Unit so as to prevent a duplicate claim for the underlying NCWP for carbon removal, and, thereby, eliminate the possibility of double spending or double earning of carbon credits based on the same carbon removal effort within the system.

FIG. 4 illustrates an exemplary system or subsystem S2 in or by which NCWP Units are transacted. Subsystem S2 essentially represents operation of a portion of system 1 as depicted in FIG. 3, including components 20, 30, and 50. More specifically, FIG. 4 illustrates the operation of system components 20, 30, and 50 by which the double counting problem mentioned above may be addressed. In this example, a User 1 decision is made on whether to request attestation and validate of a claim submission, step 302. If attestation and validation is requested, then a user type 2 reviews the claim submission by the user type 1 and validates the information therein, step 303. The user type 2 then attests to the validation. In some embodiments, a plurality of type 2 users compete to validate and attest submission claims. If attestation and validation is not requested, the user type 1 submission claim is assessed by a user type 3 without attestation and validation. Whether attestation and validation of a claim submission is requested generally affects the Discount Factors used by User Type 3 when issuing Units based on the inputs made (or not made) within the system by Type 1 and 2 Users. Within component 20, attestation to NCWP operates to prove the Unit was earned and is not double-counted from the same NCWP. Also, within component 20, additional discount factors may be applied, as algorithms are employed to ensure NCWP claims are not submitted more than once (e.g., double submissions risk removal of a user from the system). User type 3 reviews the claim submission of user type 1, with or without the validation and attestation information of a user type 2, applies relevant Discount Factors to determine the proper number of Units to award, and then issues Units, step 304. Units may, optionally, be destroyed to claim rights associated with the underlying NCWP, step 306. Upon destruction (without conversion) of a Unit, the holder of the Unit gains the verifiable and indisputable right to claim the rights associated with the original NCWP, along with all attestations and factors applied to the original submission. Thus, within component 50, transactional algorithm analysis is employed to ensure double-counting is avoided, and destruction methods ensure that the original NCWP submission is not reused and the resulting Units are not further exchanged. It is the traceable and indisputable destruction of a Unit and the significant penalties applied (where appropriate) to non-validated claims that reduce or prevent double counting or double spending within the system and keep the overall supply of Units low. It is the verification efforts made by User Types 2, 3 and 4 (although type 4 users are not shown in FIG. 4, these users act to confirm and record all transactions of Units) that imbue confidence in the inherent value of the Unit and give it its fungible nature.

In addition to the creation of a new type of commodity market, the application of Discount Factors to NCWPs facilitates the standardization of the Units such that each Unit is the same quantification and therefore fungible. In a further aspect, the disclose provides systems and methods that allow for the address of the double spending or double counting issues discussed above. The collective effects of these changes give benefits to users by: (i) increasing the trustworthiness of NCWP markets through validation; (ii) increasing the likelihood of financing for NCWP projects and businesses by creating a predictable standard Unit price; (iii) decreasing consumer confusion by transparently defining the meaning of Units; (iv) increasing the inherent value of NCWPs by reducing risk in NCWP-based markets, and by ensuring against double spending and double counting;

and (v) creating a more efficient marketplace where all NCWPs are fungible Units through the discounting process disclosed herein.

The application of Discount Factors, described herein, along with the vesting of the rights to the originating NCWPs, during creation of the Units (as represented by Component 30), followed by the eventual destruction of the Units (as represented by Component 50 described below), enable the commoditization of NCWPs into fungible Units, which are the right to claim the NCWP. In one respect, the methods for destruction of the NCWP Units provide a mechanism for establishing a point in time at which the NCWPs are both delivered and consumed. To elaborate, the NCWP Units created with the present systems and related methods of transaction impart physical attributes upon the units in that the Units may be created, stored, transferred, and destroyed (transacted). Thus, the above-described components 20, 30, and 50 combine to mitigate prior NCWP-trading limitations and inefficiencies by at once solving the standardization, transferability, and deliverability issues.

System Components and Subcomponents

FIG. 3 depicts an exemplary system for transacting a tradeable Unit in accordance with the present disclosure. System 1 may be configured to facilitate the creation, validation, trade, and destruction of Units in stages or modules. FIG. 3 shows, more particularly, distinct functionalities of system 1, characterized as system components 10, 20, 30, 40, and 50.

Component 10 receives an NCWP claim submitted by a user type 1, at 301. In component 20, as described with reference to FIG. 4 above, validation and attestation may be requested at 302. If requested, a user type 2 (third-party validator) validates and attests to the submission claim, at 303. In component 30, a user type 3 (receiving data from users type 1 and 2) applies Discount Factors, at 304. In component 40, a user exchange is maintained and facilitated, at 305, before determining the number of units to issue. The user exchange 305 may facilitate transfer of units at 317 and holding of units at 319. In component 40, the user exchange 305 may operate to support transactions and ensure that double-spending of Units does not occur. A User Type 4 may perform transactional validation and confirmation of transactions that occur in user exchange 305. In component 50, Units may be destroyed to claim the underlying rights, at 306. Destruction may be accompanied by obtaining a proof of claim for the rights associated with the underlying work product at 307. Alternatively, destruction may be accompanied by transferring and/or converting units into an external exchange 309, which may provide for transfer 311 and holding 313 by users, as well as converting 315 units into user exchange 315. In some embodiments, Unit destruction may result in subdivision of Units that may be exchanged in external exchange 309. In some embodiments, a method for the conversion of external exchange 309 subdivisions to be converted back into Units and exchanged in the user exchange 305 is provided. In some embodiments a system is provided for transacting the Unit, thereby providing a first user and a second user to effect Unit transactions, and using the system to maintain a ledger of said Units.

Thus, system 1 for transacting tradeable units representing a noncommodifiable work product, according to the present disclosure, may include at least five (5) primary components or operations (components 10, 20, 30, 40, and 50). In the system 1 of FIG. 3, each illustrated component 10, 20, 30, 40, and 50 also represents a system functionality or advantageous operation. As is further described throughout this disclosure, each of components 10, 20, 30, 40, and 50 may include a set of methods implemented in real-world measurements and/or software code, a user interface for interacting with the functionality of that component (having input/output capabilities), and the controls and mechanisms that allow each component to operate independently yet in concert with other components. Within or by way of each component, a primary system operation is performed, by user(s), upon a tradeable, fungible Unit derived from and, therefore, representing the NCWP. Components 10, 20, 30, 40, and 50 in the diagram of FIG. 3 are structured to illustrate the interoperability of the components, and, in one respect, the process flow of an NCWP Unit from creation to destruction (which is intended to correlate, in some embodiments, to the creation and delivery of a traditional commodity).

Some embodiments provide for a deterministic system of accreditation, including a method for accreditation of Users for participation in the user exchange 305 and an interface for such accreditation of Users. Thus, participation in the system can be securely regulated such that only accredited entities participate in the user exchange 305. Some embodiments provide for a method for granting permissions to Users, and an interface for granting permissions to Users. For example, a user type 1 may need to grant permission to a user type 2 and/or 3 to view the claim submission submitted by the user type 1. Some embodiments provide for a method for attestation of submissions, and an interface for attestation of submissions. For example, the method may include a user type 2 reviewing the claim submission of a user type 1, which includes taking steps to validate the facts and assertions in the submission claim. Some embodiments provide for a method for confirmation of transactions, and a method to record transactions. Thus, a first component (not shown) of the system 1 may be characterized as a system and method for accreditation (of users). In one aspect, implementation entails execution of processes and protocols for user registration, granting permissions to users preferably using automated anti-money laundering internal controls, for attestation of submissions, and for confirmation of and recordation of transactions. Further, the system preferably incorporates processes for the removal of users (as well as gaining user status), which, more preferably, entails user removal based on transaction analysis and/or the employment of algorithmic detection functionality. Further description on the implementation of these various processes and protocols may be found with the more detailed description of the different system components and the interaction between the system and users, which follow. Integration of these user interfaces will become evident with the description of the system 1 configuration, which follows, including that of various system components 10, 20, 30, 40, and 50. Integration and implementation of this accreditation component may be achieved with different system structures or configurations (which are discussed below). It is noted, however, that integration and implementation in or with a multi-structure embodiment (see e.g., FIGS. 12A and 12B and accompanying description) may provide important benefits and synergistic effects, given the elevated identity issues and concern (as opposed to a localized or centralized structure, for example), which will become apparent to one skilled in the art.

It should be understood that, in various applications, Users 3 and 4 may be embodied by the system, network, node, or component, thereof, or the appropriate custodian or operator. In a decentralized network or system employing blockchain technology, as discussed further below, user 4 may be embodied by public nodes that store the blockchain and execute transactions.

Figure 5:
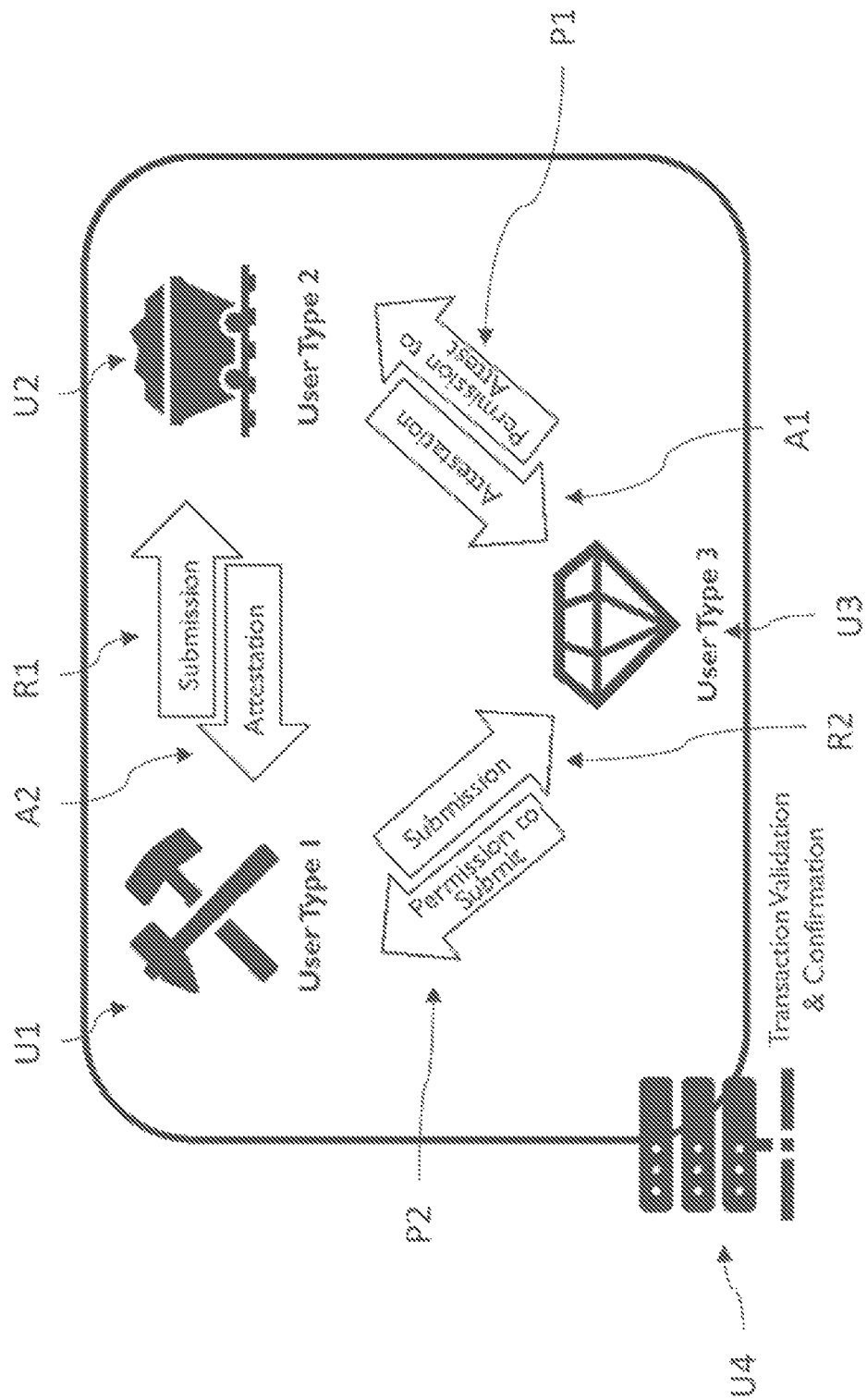
FIG. 5 is a simplified system diagram illustrating the relationships between different Users during the submission and validation of a claim to NCWPs to create Units, according to one aspect of the present disclosure.

The diagram of FIG. 5 further illustrates the interaction between four types of system users. These users employ the system to contribute to, or effect, methods of issuing Units or processing and validating transactions. User Type 1, U1, submits requests to the system to submit a claim, including request, R1, to User Type 2 U2, for validation of measures of NCWPs and/or request R2 to User Type 3, U3. User Type 2 may then act to attest, A1 and A2, that submission, which may be transmitted to User Type 3 and User Type 1. As shown, User Type 2 obtains permission, P1, from User Type 3 to attest, and User Type 1 obtains permission, P2, from User Type 3 to submit. Further in this example, User Type 4, U4, which may be embodied by the system or appropriate system component itself, oversees the transactions between User Types 1, 2, and 3 and may confirm and record the transactions.

In one aspect, the systems, methods, and articles introduced herein enable the traceable and/or indisputable creation, exchange, conversion, destruction, or transfer of Units that represent NCWPs. Systems and methods provide for transparently standardized digitized Units, preferably by incorporating third-party validation into the process of earning Units. Whereas existing technologies, at best, allow for third-party validation of the physical characteristics of the underlying Work Product, the systems and methods disclosed herein also allow for third-party validation of the underlying methodologies and technologies used to generate that Work Product. Notably, while traceability can be ensured, an example of alternative implementation may include the ability to sever traceability between the proof of claim and NCWPs.

Referring to FIGS. 1 and 3, the interoperability of Components 10, 20, 30, 40, and 50. Component 10 generally provides for system input (301), and specifically supports the submission of claims of allegedly completed NCWP (e.g., claims of completed Work Product resulting in the removal of atmospheric compounds). Accordingly, component 10 preferably presents at least one graphical user interface 11, as an input device, accessible by User Types 1. Suitable structures for use as a component or portion thereof may, of course, take many forms and combinations known in the art (e.g., dedicated servers and available computing means in a cloud-based or distributed computing network, computers).

Component 20 is primarily responsible for supporting a method of attestation, including validation of NCWP measures preferably configured to direct an attestation request to potential User Type 2 parties. That is, if a User Type 1 requests attestation, system 1 directs a User Type 2 to undertake efforts to validate the NCWP claim and, as appropriate, attest to the validation (302). In one preferred application, the system (and user interface) may be configured to allow third party validators to compete or bid for the attestation order (303, as shown in FIG. 3). In an alternative application, a third-party validator may be pre-selected, and the attestation request promptly directed to the selected User Type 2. In any event, a graphical user interface is provided to facilitate communication with User Types 2, including the conveyance of NCWP information required for the attestation and for receipt of attestation results and information.

On receipt of attestation information from User 2 and from Component 2, Component 30 is tasked with, and implemented for, the production or issuance of tradeable (317) fungible Units, as discussed previously (which may be described as a process of Unitization of Measured NCWPs, 304 in FIG. 3). In determining the number of Units to issue for the submitted NCWP claim, system 1 applies discount factors (304) and then issues the units to user 1 (see FIG. 3). As should be apparent, the Units issued are a reflection of the NCWP completed (as per submission by User 1) and, more particularly in this exemplary application, the Atmospheric Compound Reductions and related data submitted by User 1. It should be understood, however, that quantity of Units issued will not typically mirror or equate with the submission, but will be a product derived from the NCWP data received from User 1, attestation-related information from User 2, and the results of the application of Discount Factors (e.g., by User 3). Component 30 may also be equipped with a graphical user interface 31 for communicating with external actors, including User 1, for example, and conveying the results of the Unitization process (i.e., the issuance of Units and related information).

In one respect, Component 40 is responsible for the development, storage, and implementation of a process and/or protocols for valuating or discounting the subject NCWP-related information, including attestation results, and, thereby, determine the number of Units to be issued (i.e., earned quantities of units). This process may be implemented, at least partially, by prompting and executing the appropriate programmable instructions using the above-described received or derived (from User 1 and User 2) information as input. Further yet, Component 30 is tasked with the creation or issuance of units, which is referred to, herein, as the method of unitization. More specifically, Component 30 supports the process of determining the amount of units to issue based on the NCWP claim submitted and taking into account data submitted and data advanced from Component 20 or attestation. In one aspect of the present disclosure, a method or technique is introduced for making this NCWP Units determination by applying certain Discount Factors.

To further illustrate, a method of establishing and applying Discount Factors to determined earned quantities of Units may entail the following attributes and considerations:

General factors such as location, quality, time, and quantity per contract (as currently used in standard commodity contracts);

Probability functions, such as average (or expected value of) Work Products where it is not possible to gain exact measurements during a period;

Negative functions allowing for positive Units, where the NCWP removes items from an environment or is the negative occurrence of an action or event and the positive Unit measures the amount removed or the impact or consequence of the negative occurrence;

Believability functions, which deal with trustworthiness of the earner; and

Validation functions, which deal with the added value incurred by a third-party validation of the Unit earner's claimed NCWP.

Continuing to refer to both FIGS. 1 and 3, in another aspect, the exemplary system further includes Component 40, which facilitates and supports a subsystem of Unit Exchange 305 (e.g., the exchange of Units that are equivalent to Atmospheric Compound Reductions resulting from Work Product completed by Type 1 Users). Component 40 preferably includes a graphical user interface 41 for receiving and conveying information from different User Types. Whereas Components 10, 20, and 30 are generally responsible for the introduction of Units into the system, Component 40 is configured to facilitate and support the maintenance and manipulation (transacting) of the produced Units. In this respect, graphical user interface 41 is configured to accommodate User 4's participation in the exchange of Units and user exchange 305 is configured to facilitate such transaction as the transfer of units 317 and the holding of units 319. Specifically, Type 5 Users may interface with the system to purchase, exchange, and/or transfer Units, or convert Units to and from smaller denominations of Units. In this respect, the system is configured (e.g., for User 4) to review, confirm, and record the associated User 4 transactions (as well as those arising from Users 1-3 activities) utilizing database 2.

Employing user interface 41, component 40 facilitates communication with, and receipt of information from Users of different types. Component 40 is tasked with controlling interoperability between and among User Types and for facilitating users' connection and engagement with system 1, and with unit exchange 305, and optionally, communication between an external exchange 309 and system 1 and unit exchange 305. Thus, through component 40, User 4 functions as gatekeeper, facilitator, and overseer of the transacting of NCWP units within system 1. In this capacity, component 40 and/or user 4 ensures against double-spending of Units, employs programs to perform transactional validation and confirmation, and maintains recordation of prior attestations and historical transfer for each Unit. As well, component 40 is configured to facilitate back conversion of sub-Unit into Units, which entails the destruction of a required amount of sub-Unit and maintenance or adjustment of the appropriate database or ledger.

Still referring to FIGS. 1 and 3, component 50 is configured to support transference of the rights to claim the originating NCWPs that generated the Units (e.g., the Work Product completed by Type 1 Users resulting in Atmospheric Compound Reductions). Accordingly, Component 50 is equipped with graphical user interface 51 for communicating with User 6 and effecting the destruction of units e.g., for producing prior attestation and factors for destruction of Units and/or conversion of Units. As will be illustrated and discussed in more detail below, destruction arises from a User 6 request for the subdivision of Units that may be exchanged in an external exchange 309 and/or to afford user the ability to claim the benefit of the underlying NCWP.

Accordingly, Component 50 is configured for supporting processes for the destruction of units, for users 6, including conferring rights attached to NCWP, including prior attestation, discount factors, and initial submission data (destruction method 1 as further discussed herein). A similar process may be a method for issuing indirect sub-Units, post-conversion. Component 50 is also configured to support processes for a second method of destroying units, for user 6, which may include conveying ownership of NCWP and producing records of prior attestation and discount factors applied factor (to the extent as may be required by third parties in further application). As required or necessary to maintain the system's Units ledger and system integrity, component 50 will be configured to maintain and make adjustments to the system 1 and its components and records.

Finally, component 50 and its user interfaces (51) are designed to communicate with user 5 participants to support user-user transactions (e.g., exchange of units and corresponding rights). The task may include, among other things, receiving and confirming agreements between users, and maintaining the system database. In a marketplace implementation, a User Type 5 would include buyers and sellers, and in such an environment, methods for requesting and receiving agreements supported by the system would be similar to a standard market (e.g., a stock market) with bid/ask prices and a clearing mechanism (based on priority or on an ordered list). In another exemplary application, the system would support methods for requesting and receiving agreements by assuring, for example, that a sender has tokens to send and the receiver has an address at which to receive (this method is a basic transaction within a blockchain).

Figure 6:
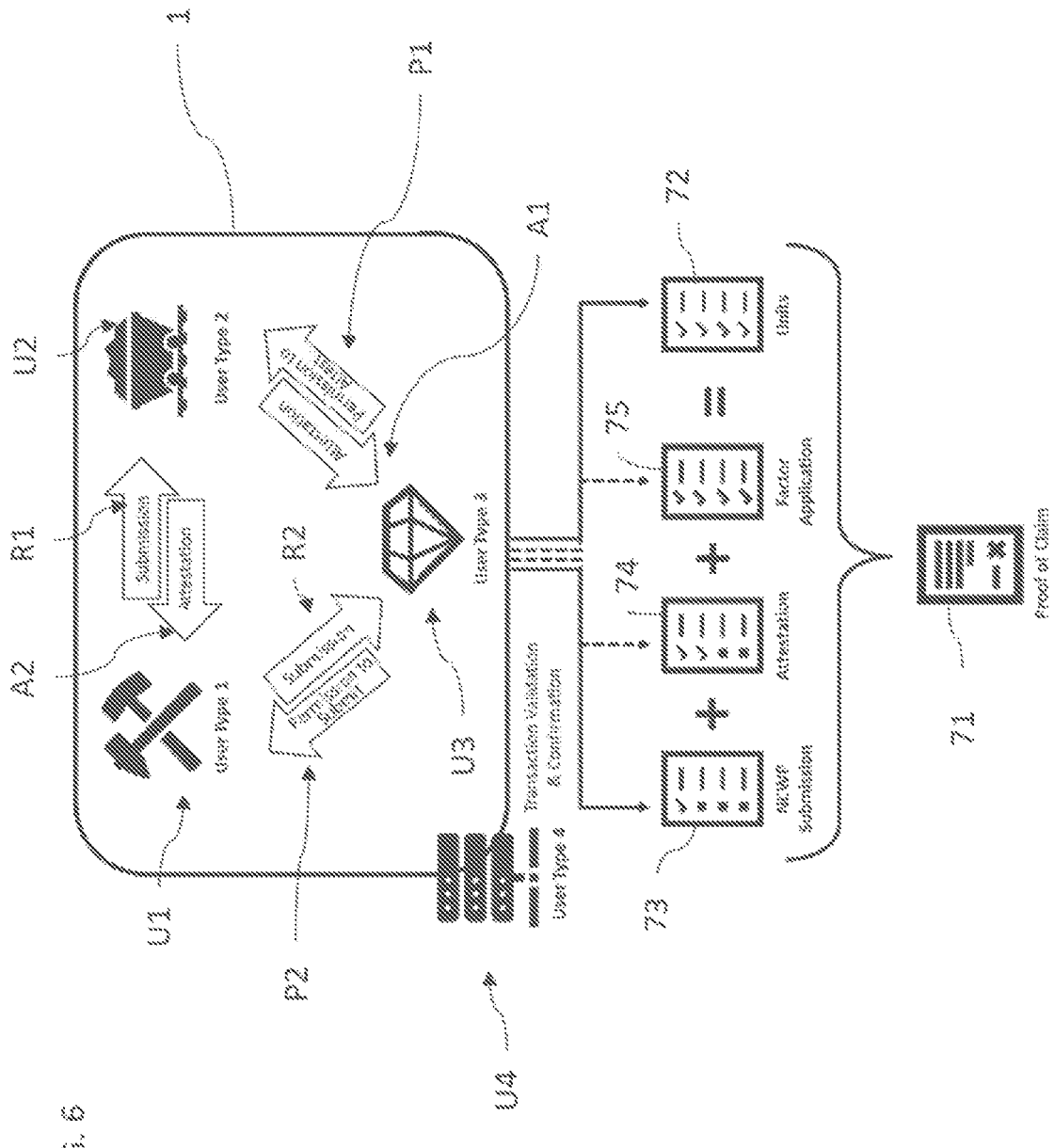
FIG. 6 is a simplified system diagram illustrating the creation of units for a given NCWP, including attestation/validation and applying discount factors, according to one aspect of the present disclosure.

The present disclosure provides for methods for vesting all rights from the originating NCWP claim into the generated Units, including providing for attestation of NCWP claims, applying relevant discount factors to NCWP claims, and accounting for the initial submission information of the NCWP claim by specific Users. With reference to FIG. 6, in some embodiments the system disclosed herein is configured to implement a means or technique of ensuring traceability of an originating NCWP, as shown by proof of claim 71. Like reference numerals between FIGS. 5 and 6 denote like elements. In this application, Unit(s) 72 (which are fungible) are generated by appropriate NCWP submission data and documentation matching the Unit request, including NCWP submission 73, attestation 74, and discount factors 75. Thus, delivery of the requested Units 72 entails delivery of unique NCWP submission 73 data, corresponding attestation 74 data, and corresponding Discount Factors 75 applied to the originating submission. In this way, information is conveyed enabling the entirety of the NCWP to be indisputably conferred to users and enable ownership of the entirety of the NCWP to be presented by users to third parties and/or validated by third parties.

Relationship between the Components

Each component interconnects through interactions between and among User Types 1, 2 and 3 and the transmission, receipt, and validation of data packets between and among User Types 1, 2, 3, 4, 5, and 6, verified by cryptographic methods. Interconnectivity of each component is shown in FIGS. 1 and 3, discussed above. The application of attestation during the process of issuing Units is not limited to any specific attestation methodologies disclosed herein. In one preferred implementation, "attestation" includes, but is not limited to, physical inspection, monitoring, identity verification, and technology assessment. The ordered application of methods for issuing Units and enabling a system of exchange, transfer, conversion, and destruction of Units is an inherent part of this disclosure. Methods may be reversed, reordered, severed, or incorporated, however, into a larger set of methods for different applications of this disclosure.

The application of Discount Factors, along with the vesting of the rights to the originating NCWPs, during the creation of the Units (as represented by Component 30), followed by the eventual destruction of the Units (as represented by Component 50), enable the system and methods disclosed herein to commodify NCWPs into fungible Units, which include the right to claim the NCWP. These components combine to overcome prior NCWP-trading limitations by at once solving the standardization, transferability, and deliverability issues. Referring again to FIG. 6, the flow of rights from creation to destruction is illustrated. FIG. 6 demonstrates the logic of the flow between the different components involved in the creation and destruction of Units. As can be seen, features, efforts, and attestations and validations combine, individually, to substantiate Discount Factors. One of the devices (component 30) identified in this disclosure applies those Discount Factors to the rights claimed by the NCWP submission to determine the rights awarded. Those rights awarded are the Units that will be traded and eventually destroyed. Another device (component 50) destroys Units as previously discussed.

Figure 7:
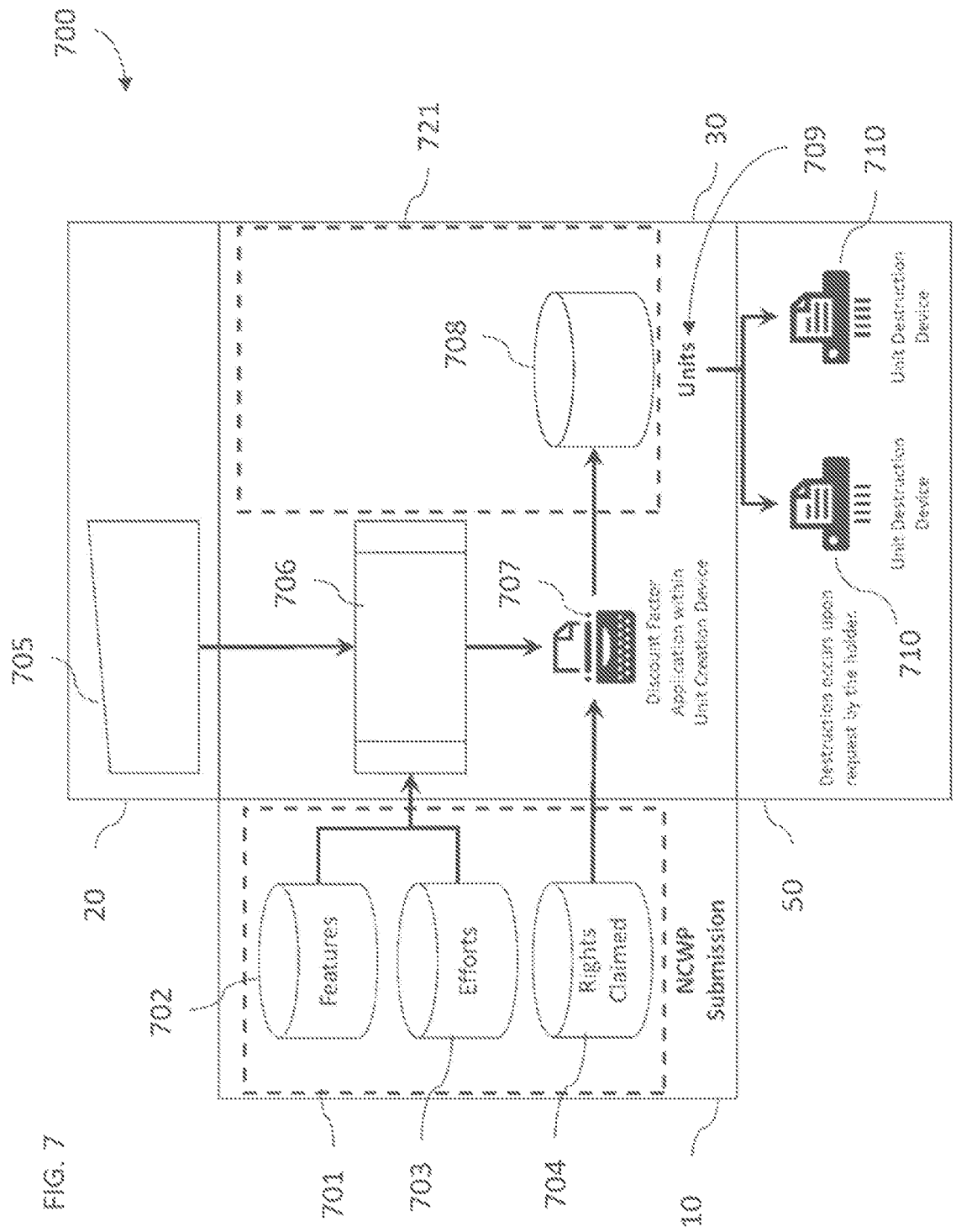
FIG. 7 is a simplified diagram illustrating an exemplary system suitable for creation of and destruction of Units, according to one aspect of the present disclosure.

Some examples of the application of Discount Factors in determining the number of units to issue for an NCWP unit claim will now be provided. For example, and without limitation, trees store carbon dioxide at an average rate per year. Consequently, a tree farm owner could submit a claim for the rights to the carbon dioxide the farm stores based on the number of trees in the farm. The Discount Factor would then be the average carbon dioxide storage per year multiplied by the number of trees. Additional multiplicative Discount Factors may be applied as part of the same submission for a variety of other reasons. In one such example, the number of Units issued for an NCWP may be reduced by 10%, such as if a tree farm owner does not allow a third-party inspector to count the number of trees in their claim. If the tree farmer presents a new submission for the same trees, the system would identify this double submission and prevent the attempted double-counting of the NCWP. In another example, if participant users earn Units based on lottery tickets, the Discount Factors could include a measure of the expected value (e.g., based on the probability and value of winning the lottery) of the lottery ticket itself The diagram of FIG. 7 is an alternate representation of a portion 700 of system 1, its configuration, and the interoperability of components 10, 20, 30 and 50, and their respective user interfaces and users. The diagram serves also to further illustrate the process of unitization, specifically the process of creating unit(s) from a specific NCWP claim submitted by User 1, submission 701, the storage and maintenance of those units in the system database 721, including a ledger, including rights awarded 708, and then, the destruction or removal of the units 709 from database 721 and/or adjustment to ledger upon request or action by user 6 and/or user 5. The NCWP claim submission 701 may be described as comprising the submission of data pertaining to NCWP features 702 and efforts 703, and the rights claimed 704, itself. User 1 interfaces with Component 20 to request Attestation and Validation of the NCWP claim (Operation 705), which in exemplary applications described herein, may be optional to User 1. In any event, the System receives User 1's submission and applies, in a standardized method, Discount Factors (706) prior to issuing Units. In the carbon credit example, Rights Claim is typically the quantity in tons that the user claims have been removed. Features may include information on the location of carbon storage facility, the type of technology used to sequester carbon, the type of measuring device installed, etc. Efforts may, in turn, relate to the use of those devices and that location, the relevant time period or duration, etc. The Features and Efforts data 702 and 703 are considered in calculating a discount rate (706), which is performed by system 1 at component 30. That rate is then applied to the quantity of carbon stored ("Rights Claimed") to arrive at a number of units the system determines (through a standardized method) is to be issued (Unit Creation) 707. Note that the Rights Claimed provides the basis that is then adjusted with the discount factors, as further described below). FIG. 7 also illustrates a transaction of the Units 709 issued, which results in or corresponds with the destruction of the Units, via Component 50, and upon request by a holder of the Units (or at least, of the number of units to be destroyed). In this example, two Units destruction devices 710 are shown to signify two destruction methods.

Exemplary Method for Development and Manufacturing

In one exemplary application, a system is provided that combines the physical, real-world interaction of participants and a series of interconnected hardware devices with certain resource requirements, methods for allowing or disallowing participants, methods for verification and validation of claims, submissions and data packets by and among participants, and methods controlling interconnectivity among participants. The software implemented by each device for each specific user type includes rules for interconnectivity. Current software solutions that could handle this type of system include blockchain or any sufficiently advanced database system. The systems (and components thereof) may be an electronic system (i.e., supported by an electronic network or the Internet) further provided with connected or connectable one or more processors, computer readable/executable storage media and input devices. The system may be configured to receive NCWP input information or data, and generate Digital Units. The system may also include a repository of data.

Implementation of one or more embodiments of the systems, techniques, and methods disclosed herein is particularly suited for and may employ blockchain-based technology to facilitate execution thereof. The described systems and methods are conducive to use of blockchain to facilitate Unit handling, validation, tracking, and related processes. Such use of familiar technology will help address and improve security, authentication, efficiency, and cost concerns that may be associated with implementation of various aspects of Additional applications, manufacturing, and implementation can include the use of a variety of systems, including software-based systems, hardware-based systems, and/or other physical systems. Thus, a variety of different implementations may be used to create, trade, and destroy the Units disclosed herein, providing a market equilibrium.

IMPLEMENTATION EXAMPLE 1: DATABASE IMPLEMENTATION

In embodiments, a system including a centralized database is used in the creation, trade, and destruction of the Units disclose herein. FIG. 8A depicts an exemplary system 800, including centralized database 899.

In some such embodiments, at least three separate entities (i.e., User Types) are in communication with centralized database 899 for access to data stored on centralized database 899. As shown in FIG. 8A, User Type 1 (801), User Type 2 (802), and User Type 3 (803) are in communication with centralized database 899. The "User Types" may be or include a device, such as a computer or smartphone, in communication with centralized database 899. User Types 1-3 may be in communication with centralized database 899 over a wired or wireless communication network for receipt and transmission of data between each User Type and the centralized database 899 and/or between different User Types.

Centralized database 899 may be a server or computer, including non-transitory data storage 803, processor(s) 805, and software 807 (computer executable instructions) stored in the data storage 803 for executing the functions of the centralized database 899. In the exemplary implementation shown in FIG. 8A, centralized database 899 (also referred to as a database structure) functions as the User Type 4 in the implementation of the process. That is, centralized database 899 is a machine (e.g., localized computer or remove server) that functions to process Unit transactions. As such, the data storage 803 is not stored or processed by other parties of system 800, such that system 800 does not require facilitation of processing or storage by decentralized User Type. While centralized database 899 is shown as a single structure, in some embodiments multiple such structures (e.g., multiple servers with multiple data storages and processors) may be used to process and store the data storage 803, or a single centralized database 899 having multiple data storages and/or multiple processors may be used to process and store the data storage 803.

In one exemplary implementation using system 800, centralized database 899 receives submission input 809 from User Type 1. User Type 1 is in communication with centralized database 899 through submission interface 811 (as explained in reference to Component 10 elsewhere herein). Centralized database 899 receives and stores submission input 809 in data storage 803 (a centralized structure). For example, software 807 may include pcomputer instructions to instruct the processor 805 to receive and store the submission input 809 from User Type 1.

After receipt and storage of submission input 809 from User Type 1, centralize database 899 may notify User Type 2 of the receipt and storage of submission input 809, and may provide User Type 2 with access to submission input 809 stored in data storage 803. The notification to User Type 2 may be implemented by an automated notification system, which may be or include computer instructions within software 807 to instruct processor 805 to transmit the notification in response to receipt and storage of submission input 809 from User Type 1. User Type 2 may access submission input 809 through a validation interface 813. User Type 2 may access the stored submission input 809 to validate the submission input 809 (as explained in reference to Component 20 elsewhere herein). User Type 2 may then submit the validation input 815 to centralized database 899. Centralized database 899 receives and stores validation input 815 within data storage 803. Within data storage 803, validation input 815 is linked with submission input 809 as submission and validation data 817. Software 807 may include computer instructions to instruct processor 805 to receive and store validation input 815 and to link validation input 815 with submission input 809.

After receipt and storage of validation input 815, and linking of validation input 815 with submission input 809 as submission and validation data 817, User Type 3 accesses submission and validation data 817 through interface 819 and performs calculations (as discussed with reference to Component 30 elsewhere herein) to manufacture the Units 821 that represent the NCWP associated with the submission input 809. The Units 821 may be stored in the data storage 803 and linked with the submission and validation data 817. For example, User Type 3 may use differentiating factors in the submission and validation data 817 to calculate an earned Unit quantification; thereby, standardizing the Units. User Type 3 may then manufacture the Units and transfer the Units to User Type 1, through centralized database 899. After receipt of the Units, User Type 1 may act as a User Type 5 in a marketplace for Units.

In the database implementation described herein, information identifying and related to the original work product that forms the basis of the issuance of the Unit(s) is contained within the stored submission and validation data 817 in the centralized database 899. In response to a holder of the Units acting as a User Type 6 to destroy those Units and claim the rights inherent to the NCWP associated with the Units, a User Type 3 classifies the Units as destroyed. The User Type 3 manufactures proof of the destruction of the Units and presents that proof to the User Type 6 that acted to destroy the Units.

In one exemplary implementation using centralized database 899, User Type 1 may submit submission NWCP claim 809 associated with the removal of a measurable quantity of carbon dioxide from the atmosphere. While carbon dioxide is a physical, measurable molecule, the absence of carbon dioxide is not. Through the application the systems and methods disclosed herein, a physical, tradeable commodity Unit is created from the absence of the $CO_2$ molecules from the atmosphere. The submission input 809 provided by User Type 1 may include a quantity of $CO_2$ removed, a location of the $CO_2$ removal, a date of the $CO_2$ removal, photographic imagery evidencing the $CO_2$ removal, and/or other data related to the $CO_2$ removal. This submission input 809 is transmitted to the centralized database 899 through submission interface 811, which is an interface that is configured specifically for submissions by a User Type 1. As discussed in more detail above, centralized database 899 then notifies User Type 2 of the submission input 809, and User Type 2 then inputs validation input 815 (e.g., verification data) of the submission input 809 data to the centralized database 899 through the validation interface 813, which is an interface configured specifically for submissions by a User Type 2. The validation input 815 may be or include an approval, disapproval, or modification of one or more aspects of submission input 809. For example, the validation input 815 may include an approval or modification of the date of $CO_2$ removal alleged by User Type 1, and/or an approval or modification of the quantity of $CO_2$ removal alleged by User Type 1. As discussed in more detail above, centralized database 701 then notifies User Type 3 of the receipt of the validation input 815. User Type 3 then performs calculations (within Component 30 as described elsewhere herein) to manufacture a specific quantity of Units 821 through interface 819, which is an interface that is configured specifically for a User Type 3 to input manufactured Units into the centralized database 899. The manufacturing of Units 821 by User Type 3 may include the application of discount factors, as described elsewhere herein. In this example, the Units 821 are representative of the work performed to remove the carbon dioxide from the atmosphere (e.g., in terms of tons). The quantity of Units 821 earned as a result of the work performed is determined in view of all of the submission input 809 and validation input 815, as standardized by the calculations performed by the User Type 3. As such, the systems and processes disclosed herein are capable of fungible commoditization of an NCWP, such as the measurable removal of carbon dioxide from the atmosphere. Once fungible commoditization of the NCWP is achieved, the users of the system 800 may transfer, trade in a market, or destroy the Units 821.

FIG. 8B depicts a simplified flow chart of one embodiment of the methods disclosed herein. Method 850 includes receiving and storing submission input, 851; notifying a User Type 2 of stored submission input, 852; receiving and storing validation input, 853; notifying a User Type 3 of stored submission and validation input, 854; receiving and storing generated Units, 855; and facilitating transfer or destruction of Units, 856.

IMPLEMENTATION EXAMPLE 2: ALGORITHMIC IMPLEMENTATION/DECENTRALIZED DATA STRUCTURES

In some embodiments, the systems and methods disclosed herein are provided using an algorithmic implementation within a distributed, decentralized data structure. The algorithmic implementation includes at least four separate entities accessing a decentralized data structure (such as a blockchain data structure). The at least four separate entities include a User Type 1 (U1), User Type 2 (U2), User Type 3 (U3), and User Type 4 (U4). With reference to FIG. 9, decentralized system 900 is depicted. In system 900, the data structure or database is distributed among multiple devices and decentralized, rather than being centralized as shown in FIG. 8 as centralized database 899. User Type 1, User Type 2, User Type 3, User Type 3, User Type 5, and User Type 6 are distributed and form nodes of a decentralized data structure 901 (e.g., blockchain data structure block).

In the algorithm implementation, the interfaces (e.g., submission interface, validation interface, and unit manufacturing interface) interact with the decentralized data structure through permissioned, automated, algorithmic processes (i.e., through smart contracts). As in the centralized database implementation, a User Type 3 manufactures Units after NCWP submissions by a User Type 1 and validation by a User Type 2. The decentralized data structure stores the inputs (submission inputs and validation inputs) from User Type 1 and User Type 2, which is associate with the original Work Product and forms the basis of Unit issuance. When a holder (a User Type 6) of the Units destroys those Units to claims the associated rights, no further transfers of those Units can occur. A User Type 3 manufactures proof of the destruction of the Units through a smart contract with specific permissions restricted to a User Type 3, and presents that proof to the User Type 6. With the exception of being distributed and decentralized, the system of FIG. 9 may function in substantially the same manner as the system of FIG. 8.

In one exemplary algorithmic implementation, User Type 1 uses the submission interface to submit the measurable removal of carbon dioxide from the atmosphere to the decentralized data structure 901. The decentralized data structure 901 controls and stores this submission input. User Type 2, a participant within the decentralized data structure 901, accesses and validates the stored data of the submission input of User Type 1. User Type 2 uses a smart contract and validation interface to access and validate the stored data. The system 900 processes and stores, cryptographically, the validation input of User Type 2 with the decentralized data structure 901. User Type 3 accesses the data input by both User Type 1 and User Type 2 (submission and validation input) and manufactures Units through use of a smart contract and data manufacture interface that is specific to User Type 3. These Units represent the work performed to remove carbon dioxide from the atmosphere (e.g., in terms of tons of carbon dioxide), where the tons are calculated using all the submission and validation input from User Type 1 and User Type 2. The performance requirements for smart contract processing are transferred to User Type 4. A User Type 5 may use a smart contract to trade the Units, and a User Type 6 may use a smart contract to destroy the units.

Figure 10:
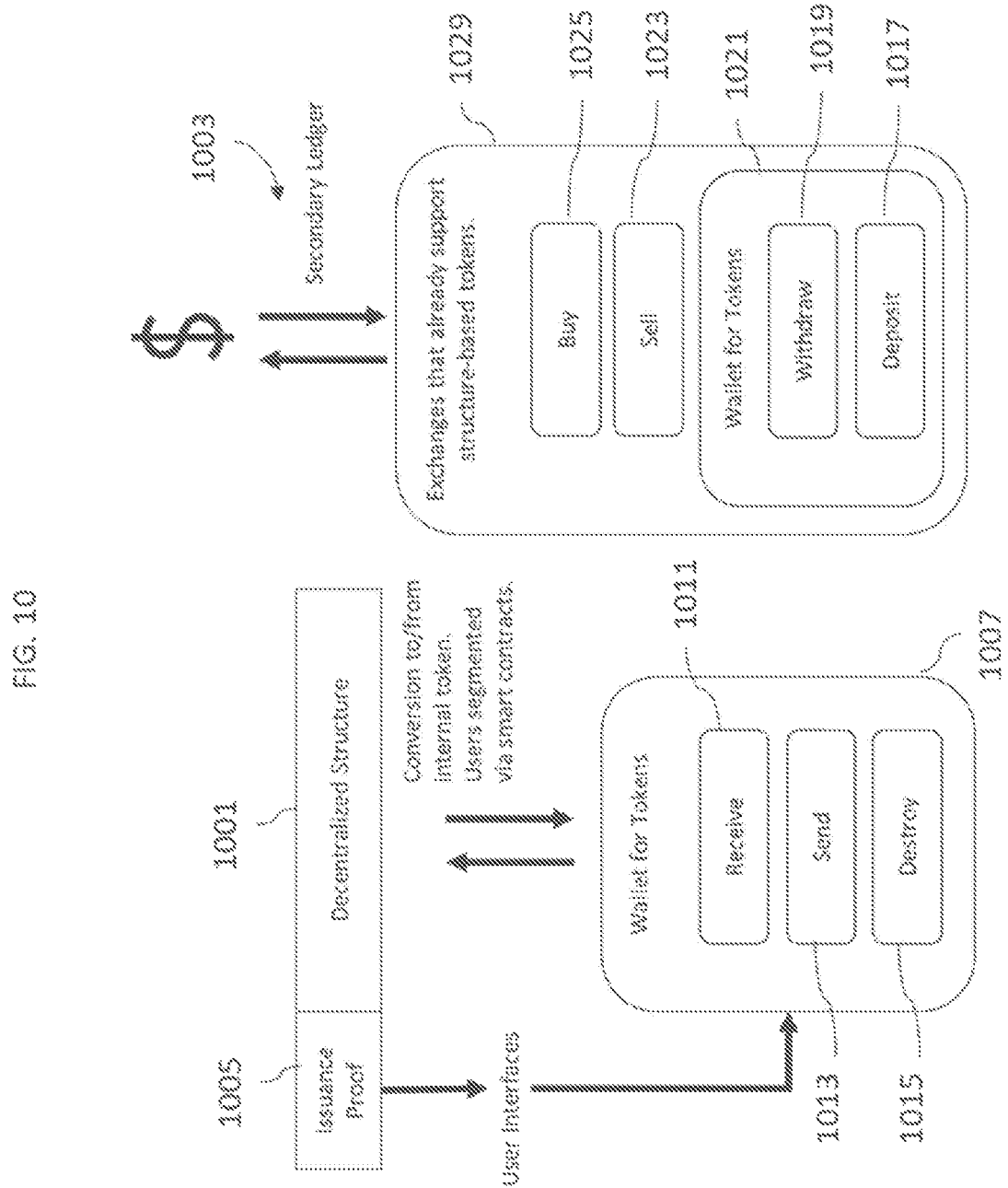
FIG. 10 depicts user interfaces interacting with a decentralized database, according to one aspect of the present disclosure.

FIG. 10 illustrates a manufacturing process of a Unit within a decentralized data structure 1001 that includes a secondary ledger 1003 that is specific to that decentralized data structure 1001. In this example, the issuance proof 1005 is the joint input from User Type 1 and User Type 2 of the information from an NCWP (i.e., is the submission and validation data) together with the calculation results of a User Type 3. An operator of such a system can create a marketplace by using a specific secondary ledger 1003, as illustrated, to deposit 1017, withdrawal 1019, view a wallet 1021, sell 1023, and buy 1025, using interface 1029. The issuance proof 1005 can be viewable by a User through wallet 1007. Wallet 1007 has controls allowing a user to receive Units 1011, send Units 1013, and destroy Units 1015. Thus, users interact through the decentralized data structure 1001 using smart contracts to facilitate transactions and destruction of Units. In the algorithmic implementation, the eccentricated data structure may provide a conversion mechanism, whereby the Unit is destroyed, that converts the Units into some other representation.

IMPLEMENTATION EXAMPLE 3:
NON-FUNGIBLE TOKEN POOL
IMPLEMENTATION

Figure 11:
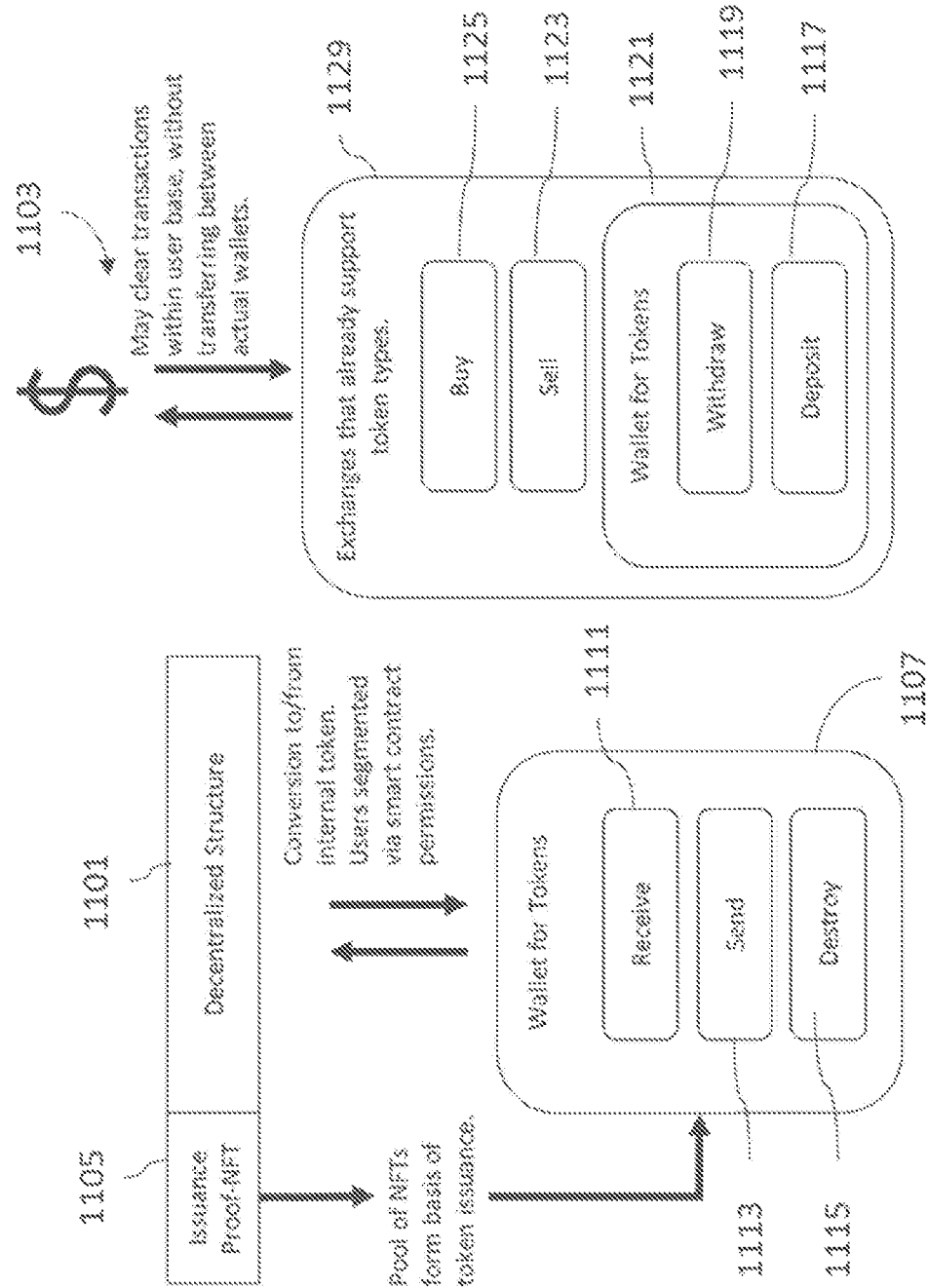
FIG. 11 depicts user interfaces interacting with a decentralized database, according to one aspect of the present disclosure.

In some embodiments, the systems and methods are implemented using a non-fungible tokens (NFT) pool. In such embodiments, an NFT is used as a digital representation of the combined input from User Type 1 and User Type 2 (i.e., the submission and validation data). In an NFT pool implementation, the input of User Type 1 and User Type 2 are cryptographically combined and stored within a decentralized data structure (e.g., a blockchain data structure) and are not transferred after combination and creation of NFT, as transfer of the NFT after creation would erode the fungibility of the Unit created from the NFT pool. Instead, the NFT pool forms the basis for Unit manufacture, such that a User Type 3 is capable of references the NFT pool programmatically through algorithms processed by a User Type 4. FIG. 11 depicts aspects of an NFT pool implementation within the Ethereum blockchain, which is an exemplary decentralized data structure. While described, in this example as the Ethereum blockchain, other blockchains or other decentralized data structures may be used in an NFT pool implementation. In the example of FIG. 11, the issuance proof 1105 is the joint input from a User Type 1 and User Type 2 of the information associated with an NCWP, together with the calculation results of a User Type 3. As in other embodiments, the joint input from a User Type 1 and User Type 2 is stored in the decentralized structure 1101 for reference and use by User Type 3. For example, for the measurable removal of carbon dioxide from the atmosphere, the NFT pool may contain submission input data such as carbon dioxide quantity, location of carbon dioxide removal, date of carbon dioxide removal, and other data from User Type 1. Also, the NFT pool may contain all validation data from User Type 2. User Type 3 initiates smart contracts to manufacture Units, as tokens, within the distributed, decentralized blockchain 1101, which a User Type 4 then processes.

FIG. 11 illustrates a manufacturing process of a token within a decentralized data structure 1101 that is similar to that shown in FIG. 10, and includes a secondary ledger 1103 that is specific to that decentralized data structure 1101. A user of such a system can deposit 1117, withdrawal 1119, view a wallet 1121, sell 1123, and buy 1125, using interface 1129. The issuance proof 1105 can be viewable by a User through wallet 1107. Wallet 1107 has controls allowing a user to receive Units 1111, send Units 1113, and destroy Units 1115. Thus, users interact through the decentralized data structure 1101 using smart contracts to facilitate transactions and destruction of Units. In the NFT pool implementation on the distributed, decentralized data structure 1101, a User Type 4 may be any participant within the network; a User Type 5 may be any recipient of Units who chooses to buy, sell, or transfer the Units; and a User Type 6 may be any recipient of Units that selects the Destroy 115 function.

IMPLEMENTATION EXAMPLE 4: MULTI-STRUCTURE IMPLEMENTATION

In some embodiments, a combination of multiple structures is used to manufacture, trade, and/or destroy the Units disclosed herein. As shown in FIG. 12A, such a multi-structure system may include a combined database node 1205 that is a combination of a localized/centralized database 1201 with a decentralized data structure 1203. Localized, centralized database 1201 may be the same or similar to centralized database 899 shown in FIG. 8A. Decentralized database 1203 may be the same or similar to the decentralized databases described in reference to FIGS. 9-11. The multi-structure implementation can be implemented with a client/server architecture, where various user interfaces log-in to different servers and the servers are in mutual communication, or can be implemented with separate local databases.

The User Types of such a multi-structure implementation may include a submitter node 1207, where a User Type 1 acts within Component 10 to give permission to other users to view User Type 1 data that is submitted as submission input, such that other users can validate and/or discount the submission input. A User Type 1 may transmit submission data to the combined database node 1205, with or without additional validation data.

The User Types of such a multi-structure implementation may include a validator node 1209, wherein a User Type 2 acts within Component 20 to view data submitted by a User Type 1, and validate data submitted by a User Type 1.

The User Types of such a multi-structure implementation may include an issuer/destroyer node 1211, where a User Type 3 acts within Component 30 to view and aggregate data from a User Type 1 and User Type 2 to calculate via a network and to submit to public nodes (blockchain dependent).

The User Types of such a multi-structure implementation may include a public node 1213, where a User Type 4 accesses Component 40 to: confirm, review and record transactions; and send and receive Units. All other users are Type 4 users with additional subtypes, and are also public nodes.

The User Types of such a multi-structure implementation may include a trader node 1215, wherein a User Type 5 and User Type 6 can participate in the market, including a wallet user. The trader node 1215 may be used to set bid and ask prices (e.g., by a User Type 5 acting within Component 40). The trader node 1215 may be used to convert Units (e.g., by a User Type 5 acting within Component 50). The trader node 1215 may be used to receive Units (by all User Types). The trader node 1215 may be used to destroy Units for Proof of Rights (by a User Type 6 acting within Component 50).

FIG. 12B illustrates a user interface 1299 that combines access to Components 10, 20, 40, and 50. User interface 1299 may be used in the multi-structure implementation. The combined database node 1205 may maintains a data structure to store NCWP submissions, NCWP data validations, and calculation information. The multi-structure database implementation uses interconnectivity of the data and processes in Components 10, 20 and 30. The combined database node 1205 accepts joint data inputs from User Types 1 and User Types 2 so that User Types 3 can determine and apply discount factors and calculate Units earned by Users Type 1 (i.e., the original data inputs form the basis of Unit manufacture). After applying discount factors, the combined database node 1205 manufactures new Units. In an NFT pool implementation, the combined database node 1205 adds data within the NFT pool, and these NFTs form the basis for issuance of tradeable, fungible Units. Within a data structure implementation or within an NFT implementation, a conversion from a Unit into some other form (including subdivisions of Units) may occur. Units may represent a measurable removal of carbon dioxide from the atmosphere (e.g., in terms of tons). As described herein, the quantity of Units earned by carbon dioxide removal (or storage) may be standardized via the discount factors disclosed herein, such that the Unit is a transactable commodity. User interface 1299 includes: an indication of unit balance, 1298; a destroy to claim carbon storage option, 1297; a submit carbon storage option, 1296; a validate carbon storage option, 1295; and receive 1293, send 1294, buy 1292, and sell 1291 options.

Additional Applications, Manufacturing, and Implementation

Additional applications, manufacturing, and implementation can occur through a variety of systems that are software-based, hardware-based, or exist physically. The resulting market equilibrium strongly illustrates the differentiating factors of the Unit manufacturing process.

IMPLEMENTATION EXAMPLE 5: NCWP FOR REVERSE APPLICATION

In some embodiments, Users Type 1 make requests for work to be performed by generating a non-fungible record of their request. This request forms the basis for an equivalent number of Units, whose destruction they are willing to pay for at a specific per-Unit bid price. Users Type 6 may then offer to destroy specific quantities of Units by completing work requests at a specific per-Unit asking price. The marketplace matches compatible bid and ask prices and assigns Users Type 6 to non-fungible records generated by Users Type 1. The following attributes are subject to validation by third-parties (Users Type 2): the number of Units required to complete the request; the level of completion and consistency at which Users Type 6 complete work; and the proof of work completed, which results in the destruction of the non-fungible records as well as its equivalent number of tokens.

Users Type 3 apply discount factors in this implementation example to these attributes. The application of discount factors by Users Type 3 results in different Unit-destroying rates across users (and other differences). In this implementation example, a secondary market for Units is unlikely to exist (i.e., there are no Users Type 5). Instead, the per-unit prices set in the bids and asks of Users Type 1 and 6, respectively, will exhibit similar market conditions. In this reverse application example, the pool of fungible Units represents all current open work requests, expressed in measurements appropriate for the work request, such as hours, points (in some software development models), person days (in project management models), or other options (as needed). The basis for Units, and specificity of work requests, is contained in the pool of non-fungible records.

An organization could apply the implementation example above to create a marketplace for peer-to-peer services, such as tutoring, software development, legal services, dog walking, elderly care, and other similar services where different providers (Users Type 6) have different attributes such as capability, efficiency, experience level, and success rate (resulting in, by way of example but not limitation, different rates of Unit destruction per hour). These attributes form the basis for the discount factors applied by Users Type 3 to standardize requests and create fungible Units, such that the provider is separable from the service. Prices for Units in this market illustrate a globally accepted rate of work performed for any given request, regardless of provider.

With reference to FIG. 20, one exemplary reverse process 2000 is shown. A user type 1 makes a request for work, 2001. A user type 2 then validates the request, 2002. If validated, a user type 3 generates an NFT, 2003. The NFT incorporates the originating request and projects requirements, 2004. A user type 3 issues units, which may be subdivided depending on project requirements, 2005. A user type 4 facilitates a marketplace, 2006. The marketplace 2006 may be the same or substantially similar to user exchange 315 as discussed with reference to FIG. 3. The marketplace 2006 allows users to ask (2008) for work and to bid (2007) on that work. The marketplace 2006 may be configured to ensure that double-spending on ask/bid transactions does not occur. The user type 4 may perform transactional validation and confirmation. Transactions in marketplace 2006 may be cleared on a traditional marketplace algorithm that matches a user type 6 prices per Unit with a user type 1 bid price per unit. A user type 2 validates completion of the work, 2009. If the completion of the work is validated, a user type 6 retires NFT from a user type 1, clearing the transaction (2010); after which, a user type 3 applies discount factors and destroys the units and/or adjusts the earning rate thereof (2011). If the completion of the work is not validated, a user type 6 recompletes the ask, 2012, and then re-enters the exchange, 2013.

Diagrammatic Illustration: Supporting Unit Transactions

Figure 13:
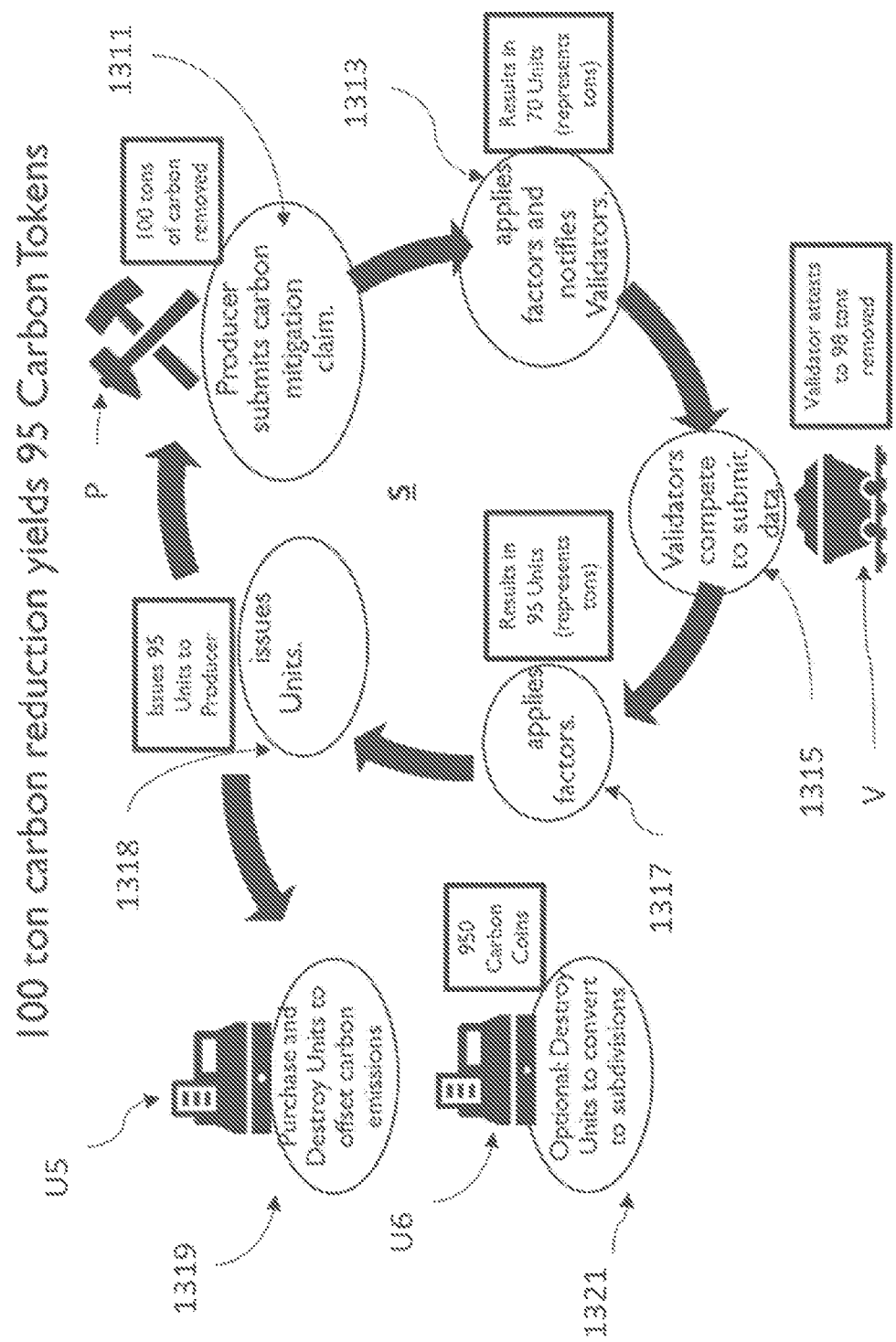
FIG. 13 depicts a life cycle of a claim from creation to destruction, according to one aspect of the present disclosure.

FIG. 13 is a simplified diagram provided to illustrate use or operation of a system and process for transacting in digitized NCWP units, and, more specifically, Carbon Credit Units or Tokens. The illustrated operation entails participation (active or passive) of multiple parties or users, including NCWP Producer P and System S. In this illustration, reference character S also signifies a System for Supporting the Transaction of NCWP Units as has been described throughout as one aspect of the disclosure. The diagram also shows an exemplary Method or Process of Unitization, specifically the submission of a request for Units for a NCWP claim of carbon which, in this example, yields 95 Units or Carbon Tokens. Producer P may be an individual or entity. Producer P engages the system via a user interface, and upon approval or accreditation, submits a carbon mitigation claim of 100 tons (1311). With Producer's submission, the system S would typically receive information relevant to the underlying NCWP including information on Producer. System S responds by evaluating the claim (e.g., the associated data), determining the number of Units appropriate for the claim, and then notifies Producer P (or submitter, if producer and submitter are not the same) (1313). System's evaluation entails, at the least, applying certain discount factors appropriate for the NCWP claim, and, in this example, results in determining 70 Units (representing 70 tons carbon credit) for Producer's Claim In this example, Producer further requests attestation, and, so, System S stages this particular NCWP claim for third party validation. Again, in this example, the system is equipped with a User interface to prompt or request a roster of pre-qualified third-party validators, V, to compete for and propose taking on the attestation. In the simplified diagram of FIG. 13, an attestation step 1315 is represented and shown as a collective step of submitting the attestation request to potential third-party validators, one or more validators attesting to NCWP claim or attestation request. This step 1315 further entails submission, by validator(s)V, of attestation data to System S. Then, with Attestation in place, as well as in receipt of attestation data, System applies discount factors (1317) to arrive at a second determination of a quantity of Units to award or assign to the NCWP claim. In the example of FIG. 13, the System S determines that the NCWP claim equates to 95 Units and thus, issues 95 Units to the submitter, Producer P (1318). This completes an exemplary application of the process of unitization, according to the present disclosure.

For clarity, and as used herein, attestation is a yes/no flag, while validation relates or reflects to an edit of the quantity presented and claimed by Producer. If a submitter claims they removed 100 tons of carbon, the validator may attest by way of sending a Yes response (e.g.., confirms that Producer employed certain technology or meter and/or a relevant date. The validator may then further validate the claimed measurement by informing that the meter measured 98 tons, not 100 tons, for example.

In this example, the first application of discount factors 1313 incorporates considerations regarding the technology (e.g., known to system) and provided with the submission. The second application of discount factors 1317 incorporates considerations derived from the validation/attestation step 1317 (e.g., base rate), and adjusts the first determination or, rather, the number of units considered earned. Here, the second application of discount factors results in an increase in the determination of units (e.g., perhaps due to increased confidence from validation and more information), but not more than the original submission) while the first one decreases the number of tokens earned. In a variation, the validation step 1315 may be excluded and the process is directed from the first application of discount factors 1313 to the system's issuance of Units 1318 (whereby, 70 Units would be issued instead of 95 Units). Note that if validation is undertaken then validation data is considered in the discount factors, but, if validation is not undertaken, then discount factors are applied that consider the fact that the submission has not undergone validation. This example shows how the system and process is configured to incentivize Producer (submitters) to obtain validation.

It should be noted that, with current market technologies, a differentiation of features for any given product is inherent in the price. In one aspect of the present disclosure, and as illustrated above, implementation of the disclosed systems and methods takes that differentiation among products and makes it inherent in the quantity. This is achieved through standardization, and further, by the application of discount factors. This does not apply to a physical product, however, because features matter for the physical product, and the relevant markets are, therefore, dependent on or built on a feature(s).

The process of transacting NCWP Units depicted in FIG. 13 also shows subsequent steps, the object of which are the units issued. In particular, two different acts or functions 1319, 1321, initiated, at least in part, by User 5 (U5) and User 6 (U6), respectively, are shown which call for the destruction of the 95 Units issued by system 1 (as discussed above). User 5 is a typical participant in the exchange embodied by the system, and may request conversion of the 95 units into unit subdivisions, as allowed by the system. In this example, a User effects, at least in part, the conversion and receipt (e.g., as holder) of the 95 NCWP units into 950 NCWP units. The reverse conversion or integration of unit may also apply in different applications. FIG. 13 also illustrates the system's destruction of the 95 Units in response, at least in part, to a request by User 6 (1321). As discussed previously, User 6 may request the right to claim 95 tons of carbon credit represented by 95 units, which necessitates the system's destruction of the 95 NCWP units. Destruction is the action of proving a claim, which allows the user effecting the destruction to claim said "removal of carbon", while the prior attestation/validation/discount factors application and unitization determines "how much carbon."

Figure 14A:
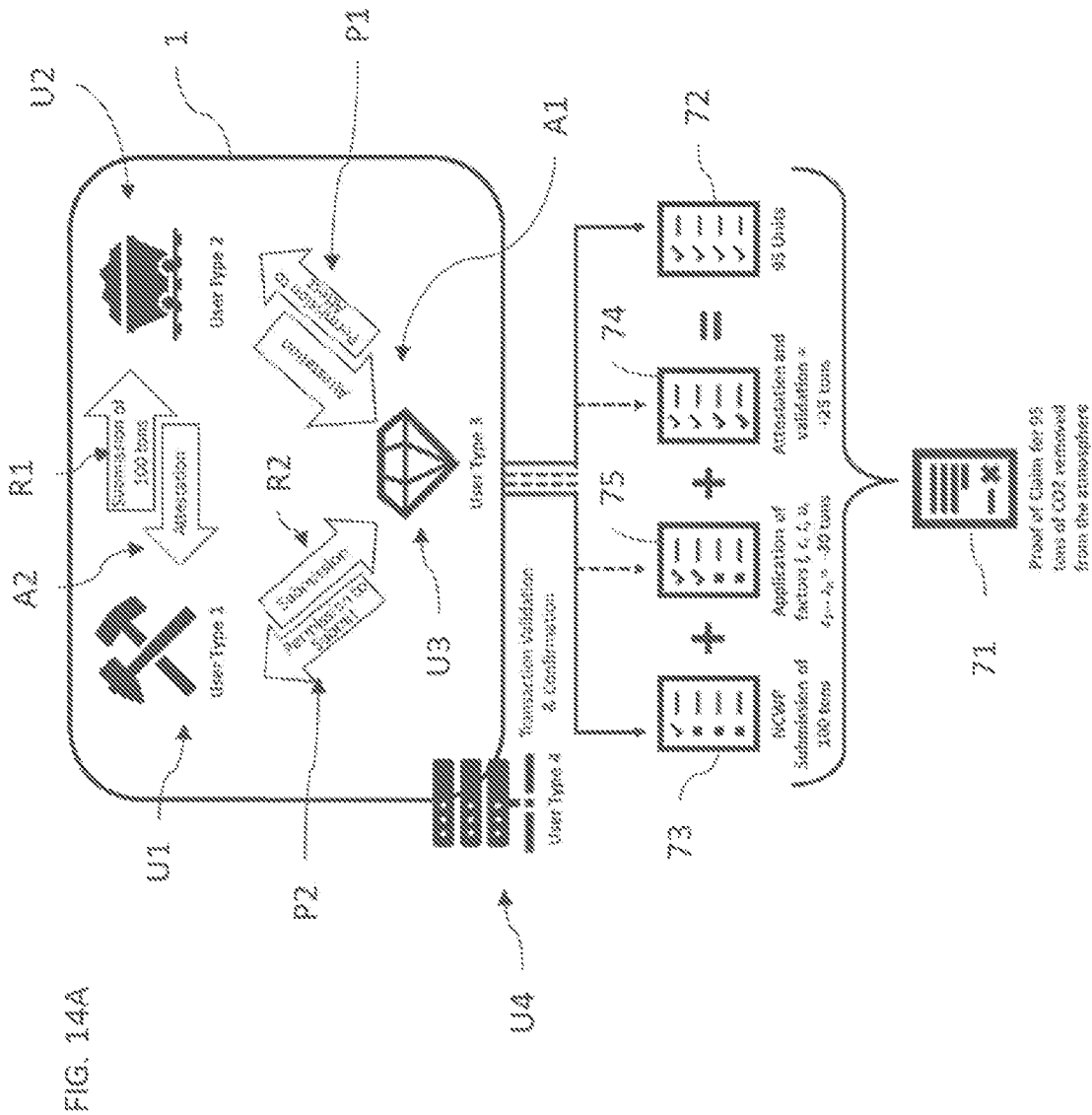
FIGS. 14A is a simplified system diagram illustrating the creation of units for a given NCWP, including attestation/validation and applying discount factors, according to one aspect of the present disclosure.

The effect of validation is further illustrated with reference to FIG. 14A, which is a simplified diagram showing the unitization process. FIG. 14A is substantially similar to FIG. 6, with like reference numerals referring to like elements. FIG. 14A illustrates a producer submitting an NCWP claim relating to 100 tons of carbon removal, and the resulting determination and issuance (by system 1) of 95 tons to per proof 71. The system shown in FIG. 14A represents the interaction between producer/submitter (User 1), Third-Party Validator (User 2), and the system (User 3). It also illustrates the step or process of determining the number of units to issue for the NCWP claim submitted by producer. In this example, this process entails the first application of discount factors 75 by system to the submitted claim 73, then, attestation 74 by a third-party validator, U2. As shown the discount factors 75 result in a reduction of units, but the attestation/validation results in the increase of units.

It should be noted that Producers, in the above example, submits their claim and proof to the system, prove (using our methods) that carbon was removed, and receive Units accordingly. When Units are issued and received, the fact that carbon has been removed is inherent in the Unit (not with the entity who made the effort). While the Producer-System User is holding the Units, it cannot claim removal of carbon anymore. That right to claim is inherent in the Unit and is only unlocked when the Unit is destroyed. Once it's destroyed, the destroyer can make the claim that they've removed carbon. The Producer-destroyer can obtain the benefit of that claim external of the system such as through a tax credit or by placing a statement in their financials, and they can attach the system's proof of destruction/proof claim, as necessary for third party verification or to lend credibility. Notably, because the Unit is easily transactable, the Unit is very easy to sell (no due diligence costs b/c trust is transparent in the NCWP pool) and the destroyer is not necessarily the same person as the submitter. If the submitter is someone who wants the external benefits of making the claim, then they could destroy the Units they are issued to make the carbon removal claim. If the submitter is not someone who wants the external benefit, they can get paid for removing carbon, sell the fact that they have removed carbon to someone else, and the buyer can destroy the Units and make the claim that they removed carbon.

Figure 14B:
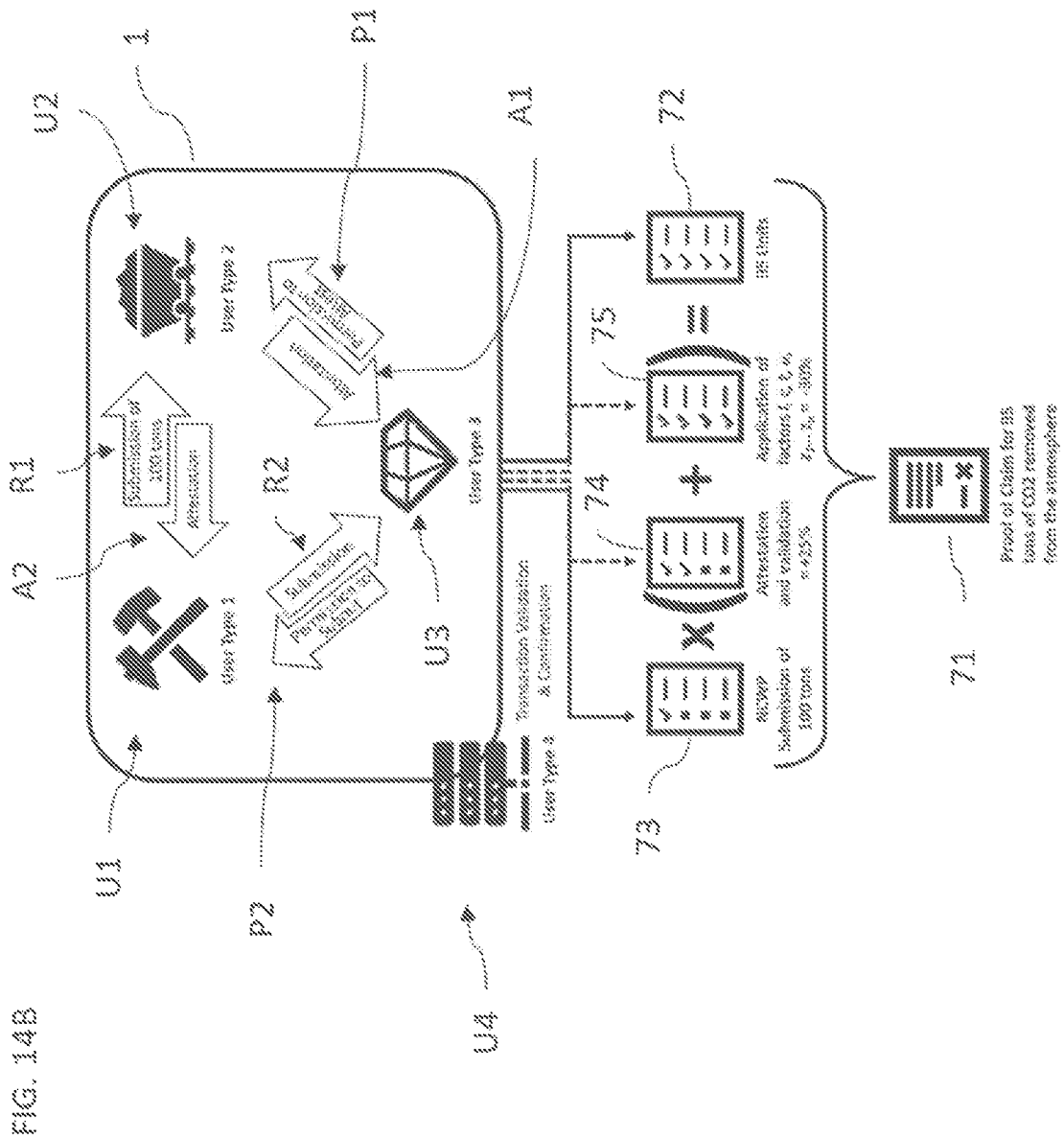
FIGS. 14B is a simplified system diagram illustrating the creation of units for a given NCWP, including attestation/validation and applying discount factors, according to one aspect of the present disclosure.

FIG. 14B is substantially similar to FIG. 14A, with like reference numerals referring to like elements. In FIG. 14B, the attestation/validation 74 and the discount factors 75 are first summed prior to being applied to (a multiplication factor) the claim 73 to determine the number of units 72.

Figure 14C:
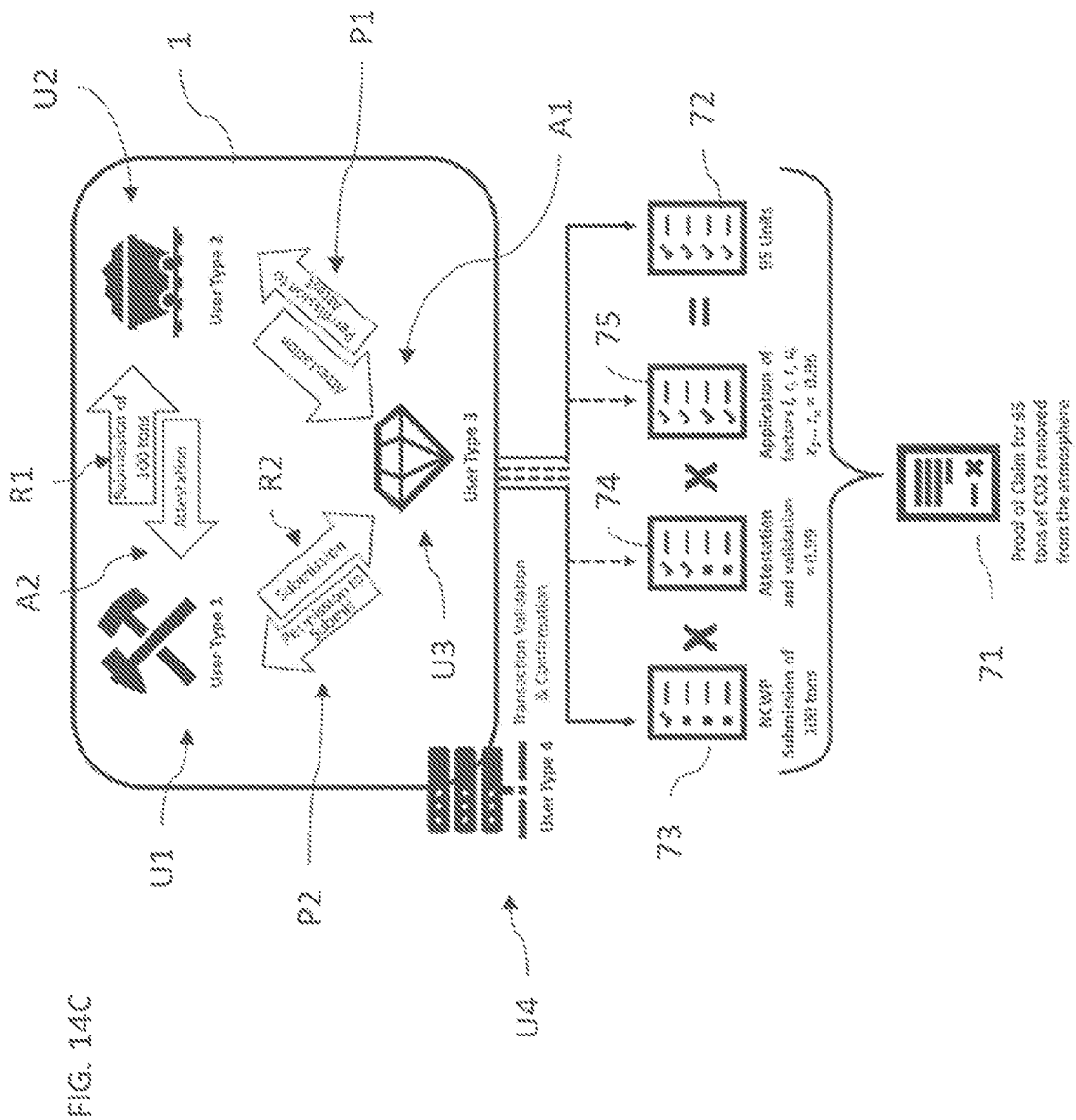
FIGS. 14C is a simplified system diagram illustrating the creation of units for a given NCWP, including attestation/validation and applying discount factors, according to one aspect of the present disclosure.

FIG. 14C is substantially similar to FIG. 14B, with like reference numerals referring to like elements. In FIG. 14C, the attestation/validation 74 and the discount factors 75 are both applied to (multiplication factors) the claim 73 to determine the number of units 72.

Figure 14D:
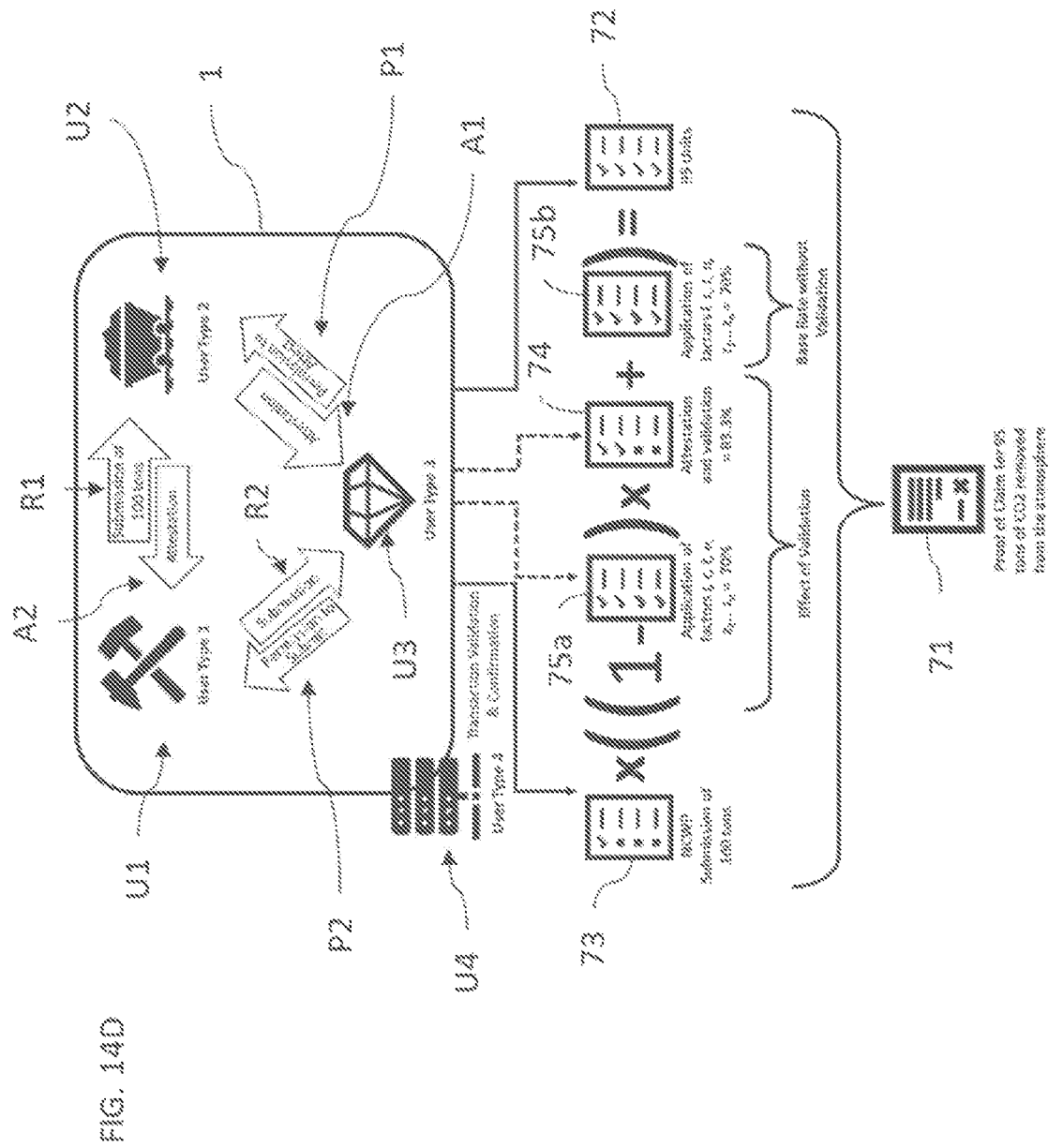
FIGS. 14D is a simplified system diagram illustrating the creation of units for a given NCWP, including attestation/validation and applying discount factors, according to one aspect of the present disclosure.

FIG. 14D is substantially similar to FIG. 14C, with like reference numerals referring to like elements. In FIG. 14D, an effect of validation is determined, which includes first discount factors 75*a* and attestation/validation 74. The effect of validation is added to a second application of discount factors 75*b*, which is associated with the base rate without validation. The combined factors are then applied to the claim 73 to determine the number of units 72. FIG. 14D also shows that the unitization process, and more particularly, the procedure or protocol that entails validation and attestation, creates a Proof of Claim (for removal of 95 tons of Carbon) that is attached to the issuance of 95 Units, in this example. Such a Proof of claim 71 is inherent in any Unit created in or by system 1. In FIG. 14D, without validation, the submission 73 would have earned 70 Units, which is 30 less units than the original claim 73. However, with validation 74, 25 of the 30 units are maintained. This example illustrates the effect of validation: validation does not exceed the original submission claim; and the system incentivizes validations. Each of FIGS. 14A-14D illustrates, mathematically, a variation of the attestation and validation procedure, employing like reference numerals to indicate like elements. The sequence of steps may differ, but the result is the same. Also, FIGS. 14A-14D show that each determination of units to issue for the submitted claim takes into account the effects of third-party validation.

Additional Processes and Subprocesses

FIGS. 15-19 illustrate various exemplary processes described above and embody separate and independent innovative methods and techniques. FIG. 15 depicts method 1500 for transacting a tradeable unit representing a completed NCWP. A primary step 1511 entails generating a first quantity of NCWP units to correspond with a first NCWP presented. This evaluative step 1511 may indicate the receipt of NCWP information specific to a completed NCWP, which may include evaluation of qualitative and/or quantitative information.

The illustrative process further includes generating a second quantity of NCWP units to correspond with a second NCWP presented, wherein each of said units is a digitized unit (1513). This determining step is standardized, and may employ the same evaluative step and/or technique as the first. As such, the second step 1513 (and any further determining steps applied to further NCWP submissions) results in the assignment or creation of a quantity of NCWP units that are based on or derived from the second NCWP submission. Each determining step is, therefore, based on or derived from a specific NCWP completion (perhaps, alleged NCWP completion, i.e., when rejected), and, in this respect, each NCWP unit is described, herein, as representing a completed NCWP, or at least a part of one or, in other instances or application, parts of more than one NCWP submission. In any event, in or with the described preferred methods, each of the NCWP units is a tradeable, digitized unit that is equal to each of said other NCWP units, and the method preferably includes effecting transactions of said NCWP units. In this context, transacting and transactions refer to an array of actions the object of which is an NCWP Unit, including creating or issuing a Unit from unique completed NCWP data ("unitization"), the transfer of ownership or right to claim a Unit (including trading between parties or users), conversion of Units resulting in subdivision of units or, the reverse, integrating subunits into another unit product, of and the destruction of a Unit, for purchase of units and/or issuance of proof of claim for transfer of right to claim benefit of underlying completed NCWPs.

The method may also include providing a system to support transaction of said units (1515), and using the system to support transaction of the units (1517), including drawing a number of units from said accounting of units to satisfy a transaction. Such a system supporting a transaction and a corresponding subprocess for supporting a transaction may entail, for present purposes, providing an electronic network that stores and accounts issued units (and destroyed unit), e.g., by maintaining a unit ledger and presenting user electronic user interfaces to allow user access the network to effect, at least partly, unit transactions. In one aspect of the present disclosure, the system is used to support a transaction by storing issued units, destroying or removing units from its database upon satisfying a user request for obtaining the right to claim the benefit of an underlying NCWP, converting units into subdivisions (or the reverse), assigning units to support user exchanges (or trades), and the system equivalent of many other commodity-based transactions as effected through current market technologies.

FIG. 16 presents yet another, exemplary process of transacting a tradeable NCWP unit, according to the present disclosure. The process in FIG. 16 exemplifies the ability to unitize and/or account/store units, and/or destroy units, which affects the unit ledger/accounting of units. Method 1600 includes a user performing an NCWP, 1601, and submitting a claim for units based on the NCWP, 1602. Method 1600 includes receiving the claim for units based on the NCWP, 1604. The method then includes either validating the claim for units (1605a) or applying a first discount factor to the claim for units (1605b). Method 1600 then includes applying a second discount factor to the claims for units, and determining the number of units that corresponds to the claim for units, 1606. Method 1600 includes issuing the determined number of units, 1607. In some embodiments, the steps within 1603 are performed by the system disclosed herein, and the steps 1601 and 1602 are performed by a user of the system.

Figure 17:
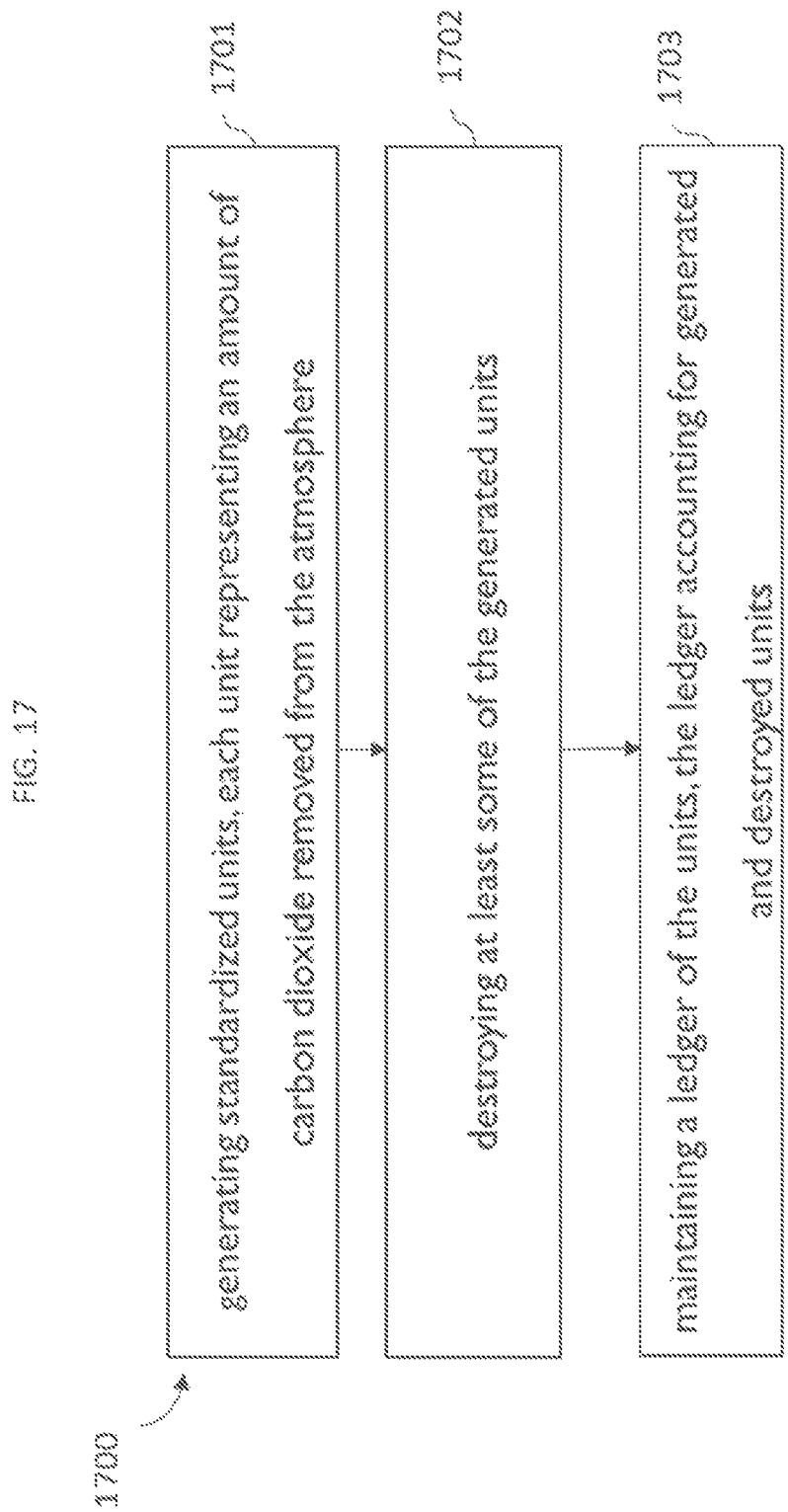
FIG. 17 is a flow chart of an exemplary process, according to one aspect of the present disclosure.

FIG. 17 depicts a method for accounting of units. Method 1700 includes generating standardized units, with each unit representing an amount of carbon dioxide removed from the atmosphere, 1701. Method 1700 includes destroying at least some of the generated units, 1702. Method 1700 includes maintaining a ledger of the units, the ledger accounting for generated and destroyed units, 1703.

Figure 18:
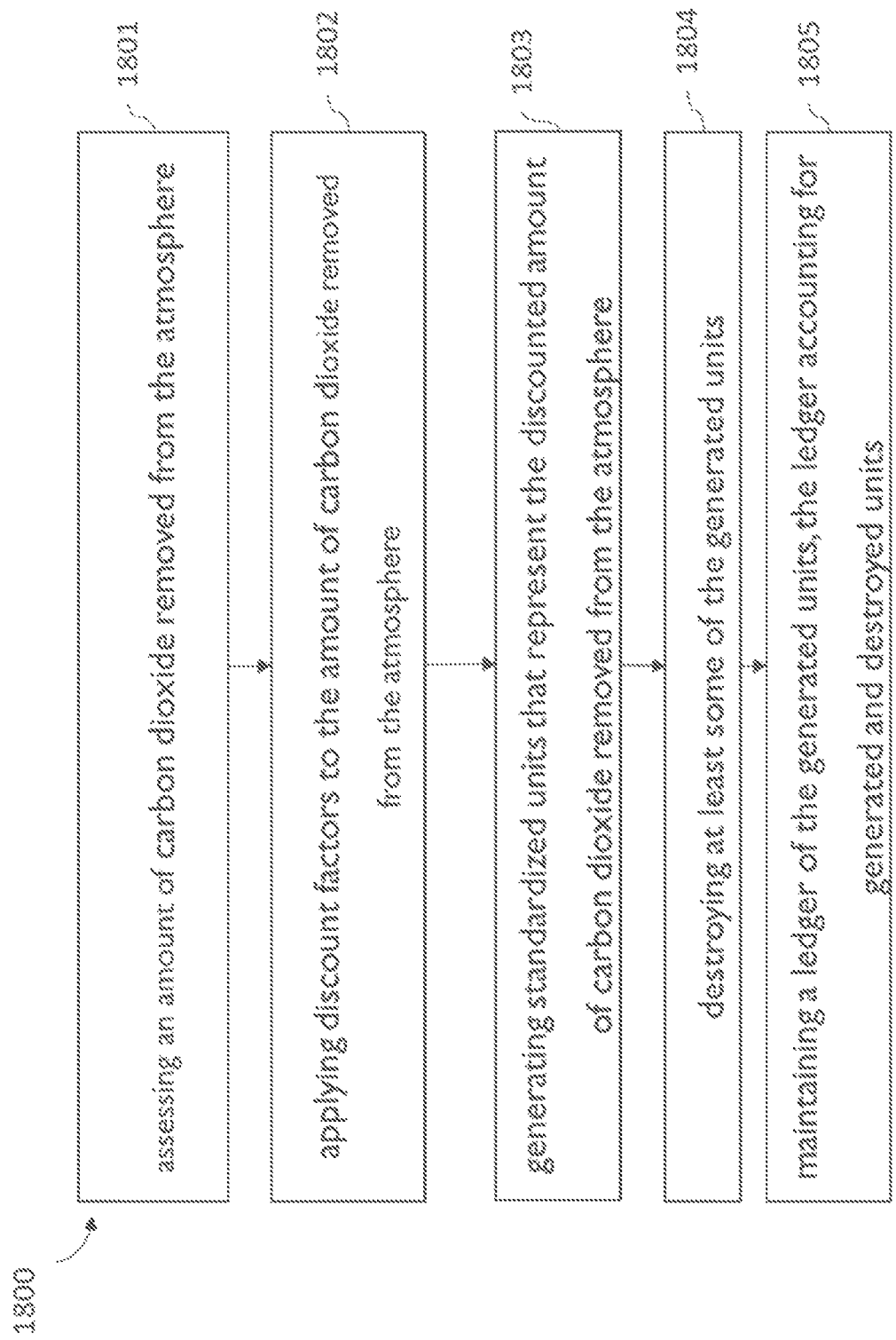
FIG. 18 is a flow chart of an exemplary process, according to one aspect of the present disclosure.

FIG. 18 depicts another method for accounting of units. Method 1800 includes assessing an amount of carbon dioxide removed from the atmosphere, 1801. Method 1800 includes applying discount factors to the amount of carbon dioxide removed from the atmosphere, 1802. Method 1800 includes generating standardized units that represent the discounted amount of carbon dioxide removed from the atmosphere, 1803. Method 1800 includes destroying at least some of the generated units, 1804. Method 1800 includes maintaining a ledger of the units, the ledger accounting for generated and destroyed units, 1805.

Figure 19:
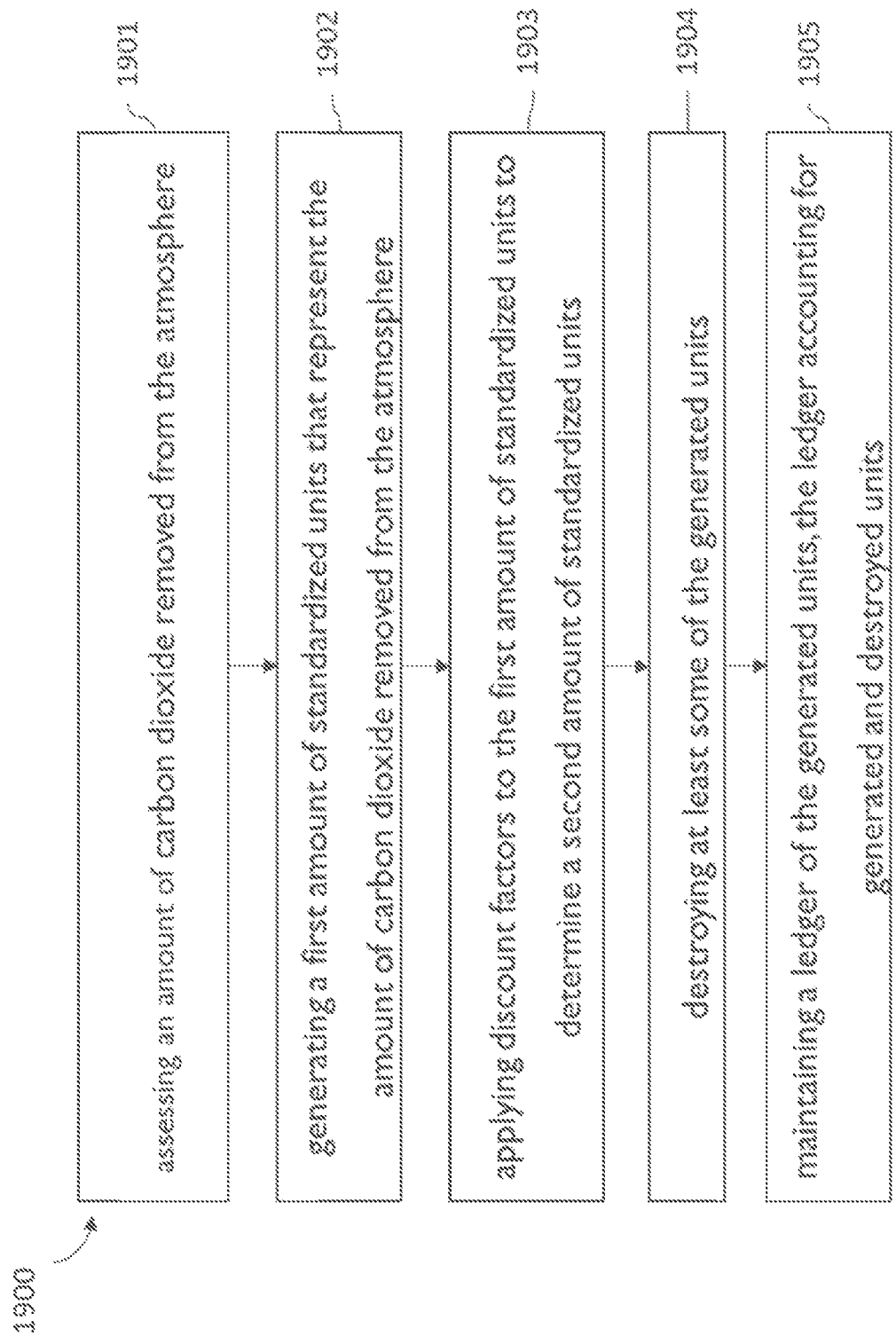
FIG. 19 is a flow chart of an exemplary process, according to one aspect of the present disclosure.

FIG. 19 depicts another method for accounting of units. Method 1900 includes assessing an amount of carbon dioxide removed from the atmosphere, 1901. Method 1900 includes generating standardized units that represent the discounted amount of carbon dioxide removed from the atmosphere, 1902. Method 1900 includes applying discount factors to the amount of carbon dioxide removed from the atmosphere, 1903. Method 1900 includes destroying at least some of the generated units, 1904. Method 1900 includes maintaining a ledger of the units, the ledger accounting for generated and destroyed units, 1905.

Figure 21A:
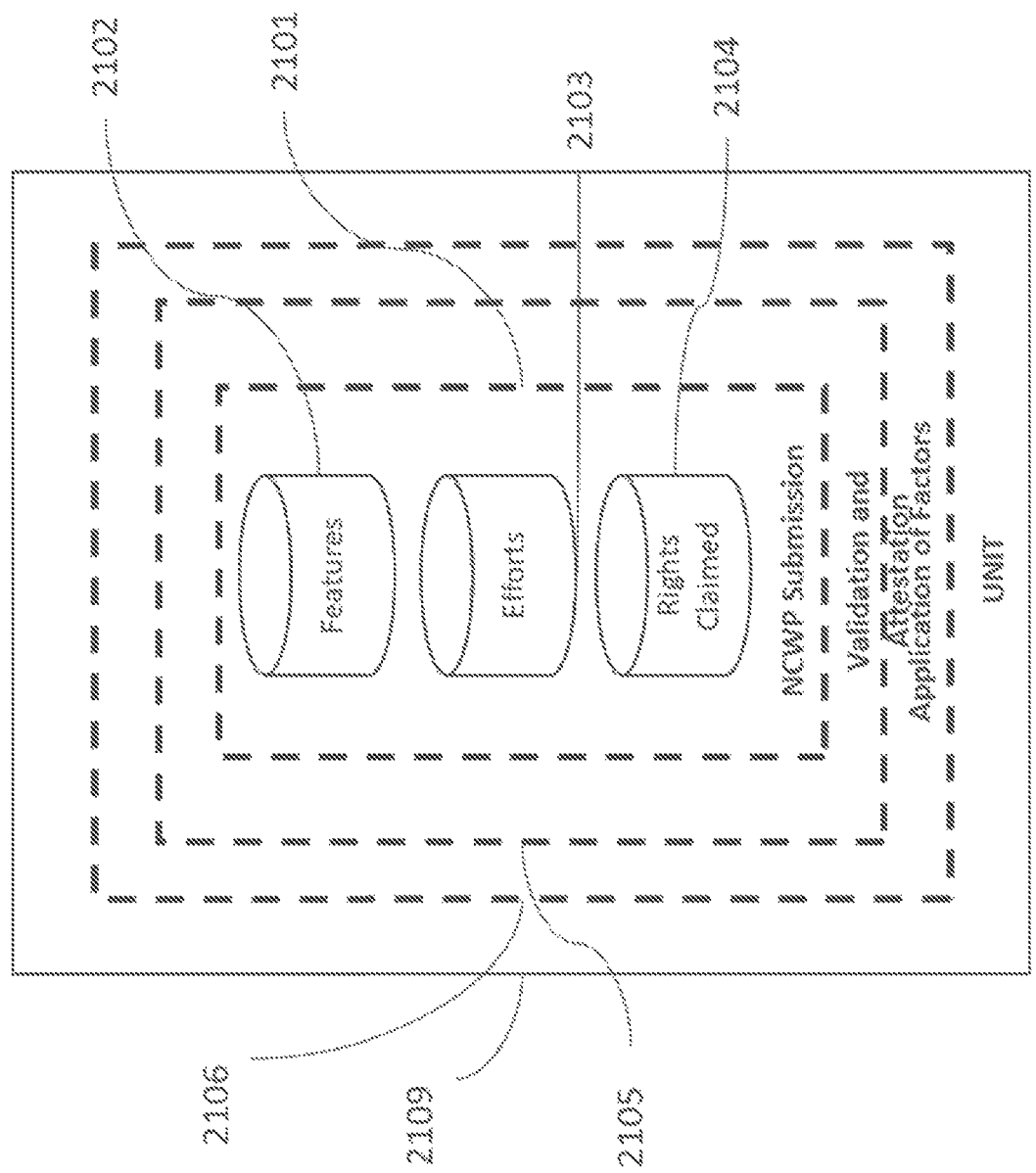
FIG. 21A is a schematic of the elements that result in the generation of a Unit.

With reference to FIG. 21A, a Unit 2109 is created on the basis of an NCWP submission 2101, including related features data 2102, efforts data 2103, and rights claimed data 2104; validation and attestation to that submission 2105; and the application of discount factors 2106. In referred embodiments, with creation of the unit 2109, the connection from that unit 2109 to any specific NCWP that resulted in the generation of that unit is severed. Thus, while a reference to the originating NCWP may be maintained, issuance of Units, in the preferred application, severs the link between the unit and the NCWP to maintain fungibility of the Units. Additionally, the NCWP data (2101) may be stored in a database and used to generate various displays (such as a data dashboard), while the link between the NCWP data (2101) and Unit (2109) remains severed. Alternatively, a database server may also exist that maintains the link between NCWP data (2101) and Units (2109).

Figure 21B:
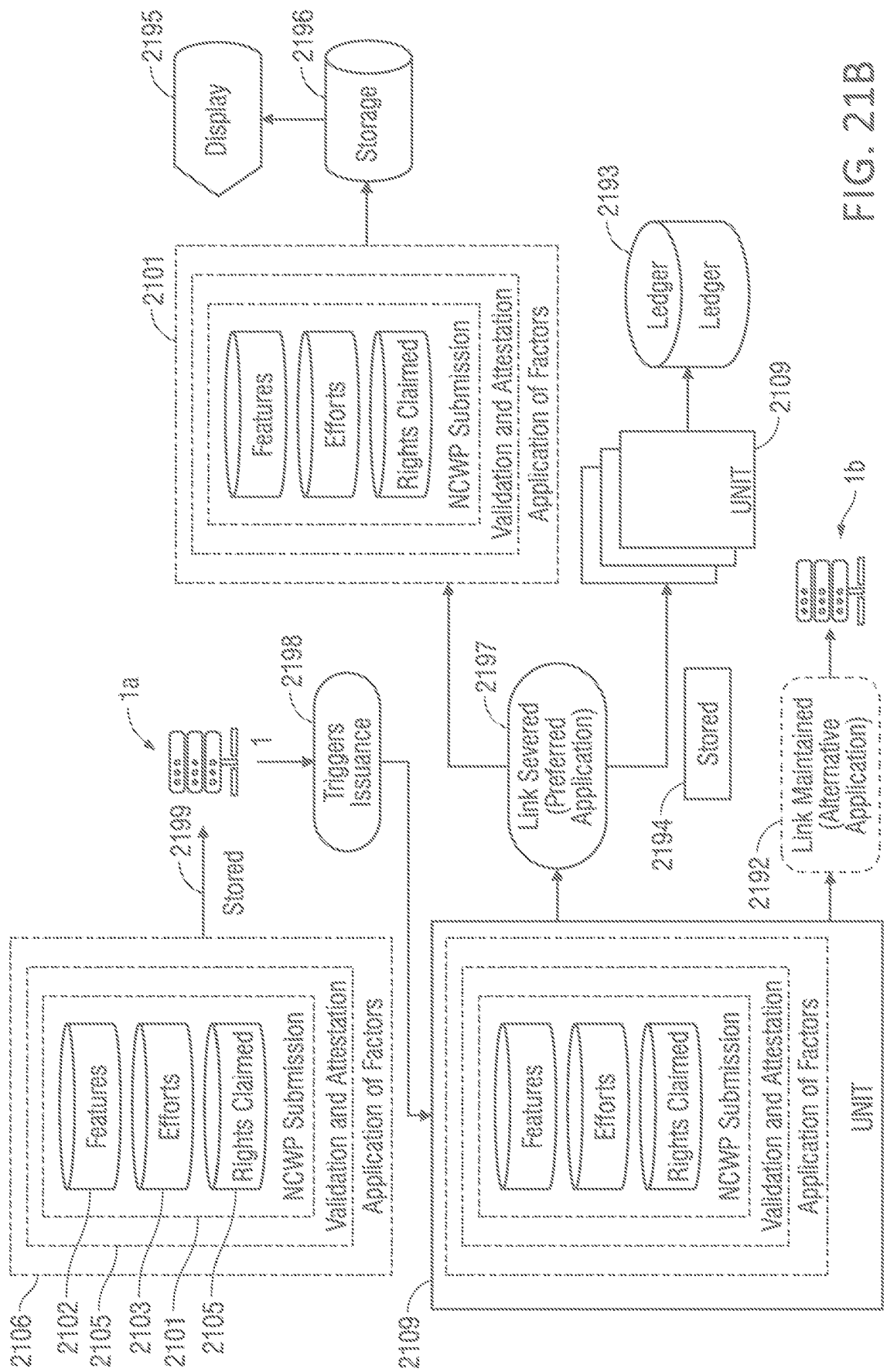
FIG. 21B is a schematic of the generation of a Unit from an NCWP submission and the subsequent storage of the Unit and the NCWP submission, either linked or severed, according to one aspect of the present disclosure.

With reference to FIG. 21B, the handling of NCWP and Unit data storage and accounting is illustrated. An NCWP submission 2101, identical to that shown in FIG. 21A, is stored (2199) in system 1, which triggers issuance of units (2198). The issued Units 2109 are identical to that shown in FIG. 21A. Preferably, the link between the issued units 2109 and the NCWP submission 2101 is severed (2197), such that the NCWP submission 2101 is stored in data storage 2196, which can be displayed at display 2995. Also, by severing the link between the issued Units 2109 and the NCWP submission 2101, the Units 2109 are stored (2194) in a ledger 2193. Alternatively, the link between the issued units 2109 and the NCWP submission 2101 is maintained (2192), such that the issued units 2109 and the NCWP submission 2101 are stored together in system 1b (e.g., a database).

These and other variations of the disclosure will become apparent to one generally skilled in the relevant art provided with the present disclosure. Consequently, variations and modifications commensurate with the above teachings, and the skill and knowledge of the relevant art, are within the scope of the present disclosure. The embodiments described and illustrated herein are further intended to explain best or preferred modes for practicing the disclosure, and to enable others skilled in the art to utilize the disclosure and other embodiments and with various modifications required by the particular applications or uses of the present disclosure.

The following is an exemplary listing of claims, various applications, variations, and/or embodiments contemplated by described concepts. The concepts include methods, products, systems, user interfaces, media, articles of manufacture and other concepts discussed above, that are characterized by the below listing of features. This list should not be considered limiting, however, as the elements or features listed below, in respect to methods, products, systems, articles, etc. may be combined with each of the other elements associated with other methods, products, systems, articles, etc. The same applies to methods and various, exemplary steps listed below. Also, the Specification, including the Summary, the Drawings, and the claims, describe or depict other applications, variations, embodiments, and combinations of elements which may not be included below, but are contemplated as encompassed by the described concepts.

What is claimed is:

1. A system for facilitating transacting tradeable units representing a noncommodifiable work product ("NCWP"), said system comprising:
 a database configured to receive and store NCWP claims from a plurality of users, the database comprising a processor, a non-transitory data storage, and computer instructions stored in the data storage, including computer instructions to instruct the processor to:
  determine quantities of units that correspond with NCWP claims, wherein determining quantities of units that correspond with an NCWP claim includes determining an amount of carbon dioxide removed from the atmosphere;

generate units such that each generated unit is equal to each other generated unit;

receive attestation of validations of NCWP claims, and increase a quantity of units that correspond with that NCWP claim in response to said attestation of said validation;

provide a user exchange and facilitate transactions of the units amongst users within the user exchange;

determine quantities of units to destroy in response to requests from users, destroy said determined quantities of units, and issue proofs of claim to said users, said proofs of claim representative of said destroyed quantities of units; and maintain a ledger within said database of said plurality of units, said ledger accounting for all generated units and all destroyed units.

2. The system of claim 1, wherein said NCWP claim includes a removal of carbon dioxide from the atmosphere.

3. The system of claim 1, further comprising computer instructions to apply discount factors to NCWP claims to reduce a quantity of units that correspond with that NCWP claim.

4. The system of claim 1, wherein each unit is representative of an amount of carbon dioxide removed from the atmosphere.

5. The system of claim 1, wherein the NCWP claim includes a location of a carbon storage facility.

6. The system of claim 1, wherein the NCWP claim includes a type of technology used to sequester carbon.

7. The system of claim 1, wherein the NCWP claim includes a type of measuring device installed to measure carbon.

8. The system of claim 1, wherein the NCWP claim includes a time period or duration of carbon removal.

9. The system of claim 1, further comprising computer instruction to sever the NCWP claim from the generated quantity of units upon generation of a quantity of units that correspond with that NCWP claim.

10. The system of claim 1, wherein the database comprises a decentralized database, and wherein said ledger is maintained on a blockchain.

11. A system for facilitating transacting tradeable units representing a noncommodifiable work product ("NCWP"), said system comprising:

a database configured to receive and store NCWP claims from a plurality of users, the database comprising a processor, a non-transitory data storage, and computer instructions stored in the data storage, including computer instructions to instruct the processor to:

determine quantities of units that correspond with NCWP claims, wherein determining quantities of units that correspond with an NCWP claim includes determining an amount of carbon dioxide removed from the atmosphere;

generate units such that each generated unit is equal to each other generated unit;

receive attestation of validations of NCWP claims, and increase a quantity of units that correspond with that NCWP claim in response to said attestation of said validation;

provide a user exchange and facilitate transactions of the units amongst users within the user exchange;

determine quantities of units to destroy in response to requests from users, destroy said determined quantities of units, and issue proofs of claim to said users, said proofs of claim representative of said destroyed quantities of units;

apply discount factors to NCWP claims to reduce a quantity of units that correspond with that NCWP claim;

sever the NCWP claim from the generated quantity of units upon generation of a quantity of units that correspond with that NCWP claim; and maintain a ledger within said database of said plurality of units, said ledger accounting for all generated units and all destroyed units.

12. A system for facilitating transacting tradeable units representing a noncommodifiable work product ("NCWP"), said system comprising:

a database configured to receive and store NCWP claims from a plurality of users, the database comprising a processor, a non-transitory data storage, and computer instructions stored in the data storage, including computer instructions to instruct the processor to:

determine quantities of units that correspond with NCWP claims, wherein determining quantities of units that correspond with an NCWP claim includes determining an amount of carbon dioxide removed from the atmosphere;

generate units such that each generated unit is equal to each other generated unit;

receive attestation of validations of NCWP claims, and increase a quantity of units that correspond with that NCWP claim in response to said attestation of said validation;

provide a user exchange and facilitate transactions of the units amongst users within the user exchange;

determine quantities of units to destroy in response to requests from users, destroy said determined quantities of units, and issue proofs of claim to said users, said proofs of claim representative of said destroyed quantities of units;

apply discount factors to NCWP claims to reduce a quantity of units that correspond with that NCWP claim; and maintain a ledger within said database of said plurality of units, said ledger accounting for all generated units and all destroyed units.

\* \* \* \* \*